US007904401B2

(12) United States Patent
Dolby et al.

(10) Patent No.: US 7,904,401 B2
(45) Date of Patent: Mar. 8, 2011

(54) SCALEABLE ONTOLOGY REASONING TO EXPLAIN INFERENCES MADE BY A TABLEAU REASONER

(75) Inventors: Julian Timothy Dolby, Riverdale, NY (US); Aditya A Kalyanpur, Westwood, NJ (US); Aaron Stephen Jay Kershenbaum, New City, NY (US); Achille Belly Fokoue-Nkoutche, White Plains, NY (US); Li Ma, Beijing (CN); Edith Gail Schonberg, New York, NY (US); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 11/708,949

(22) Filed: Feb. 21, 2007

(65) Prior Publication Data
US 2007/0233627 A1 Oct. 4, 2007

(51) Int. Cl.
*G06N 5/00* (2006.01)
(52) U.S. Cl. .......................................... 706/45; 709/219
(58) Field of Classification Search .................... 706/45; 709/202, 219
See application file for complete search history.

(56) References Cited

U.S. PATENT DOCUMENTS

| 5,883,957 A | * | 3/1999 | Moline et al. ................... 705/57 |
| 6,065,039 A | * | 5/2000 | Paciorek ........................ 709/202 |
| 6,067,566 A | * | 5/2000 | Moline .......................... 709/219 |

OTHER PUBLICATIONS

Deselaers, Features for Image Retrieval, Thesis, Rheinisch-Westfaelische Technische Hochschule Aachen, 2003, pp. 1-109.*

* cited by examiner

*Primary Examiner* — Wilbert L Starks, Jr.
(74) *Attorney, Agent, or Firm* — Michael J. Buchenhorner; Vazken Alexanian

(57) ABSTRACT

Methods and apparatus, including computer program products, for scalable ontology reasoning. A method of generating a summarized ontology includes loading an ontology from a store, eliminating relationships in the ontology, the eliminating relationships including an insertion of new relationships that simplify the ontology, eliminating individuals in the ontology, the eliminating individuals including insertion of new individuals to simplify the ontology, eliminating concepts in the ontology including insertion of new concepts to simplify the ontology, and generating the summarized ontology from the eliminating relationships, eliminating individuals and eliminating concepts.

41 Claims, 5 Drawing Sheets

SCALEABLE ONTOLOGY REASONING TO EXPLAIN INFERENCES MADE BY A TABLEAU REASONER

BACKGROUND

The present invention relates to data processing by digital computer, and more particularly to scalable ontology reasoning.

In recent years the development of ontologies—explicit formal specifications of the terms in the domain and relations among them—has been moving from the realm of Artificial-Intelligence laboratories to the desktops of domain experts. Ontologies have become common on the World-Wide Web. The ontologies on the Web range from large taxonomies categorizing Web sites (such as on Yahoo!) to categorizations of products for sale and their features (such as on Amazon).

An ontology defines a common vocabulary for researchers who need to share information in a domain. It includes machine-interpretable definitions of basic concepts in the domain and relations among them. Description Logic (DL) provides the theoretical foundation for semantic web ontologies (OWL). A DL ontology can be divided conceptually into three components: the Tbox, the Rbox and the Abox. The Tbox contains assertions about concepts such as subsumption (Man v Person) and equivalence (Man_MaleHuman). The Rbox contains assertions about roles and role hierarchies (hasSon v hasChild). The Abox contains role assertions between individuals (hasChild(John;Mary)) and membership assertions (John: Man). All standard reasoning tasks in expressive DL ontologies, such as query answering, reduce to consistency detection. As an example, a standard approach to testing if John is a member of the concept Man requires testing if the addition of the assertion (John: :Man) makes the Abox inconsistent using the tableau algorithm. A challenge is that consistency detection in expressive DL is well known to be intractable in the worst-case. Given that the size of an Abox may be in the order of millions of assertions, this complexity poses a serious problem for the practical use of DL ontologies, which often reside in frequently updated transactional databases. Although highly optimized DL tableau algorithms exist, they cannot be easily adapted to Aboxes in secondary storage, especially for frequently changing Aboxes. One approach that has been applied to reasoning on Aboxes in secondary storage is to convert DL to disjunctive datalog, and use deductive databases to reason over the Abox. It is desirable to provide a method and apparatus to simplify an ontology and to provide reasoning and query processing on the simplified ontology.

SUMMARY

The present invention provides methods and apparatus, including computer program products, for scalable ontology reasoning.

In one aspect, the invention provides an apparatus comprising an ontology processing component for accessing an ontology and for creating an abstraction of the ontology. The abstraction is created by performing at least one of the steps of simplifying relationships in the ontology wherein the simplifying comprises inserting a new relationship, collapsing individuals in the ontology wherein the collapsing comprises inserting newly defined individuals into the ontology, and eliminating concepts in the ontology wherein eliminating comprises inserting new concepts to simplify the ontology. An important property of the abstraction is that it preserves inconsistencies: if the original Abox is inconsistent, then the abstraction will also be inconsistent. In one aspect, the invention features an apparatus including an import module, a scope definition module, a query processing component, a storage manager, a reasoning engine with the ontology processing functionality, and a data store.

In embodiments, the import module can enable an import of OWL Web Ontology Documents into a persistent store that a reasoner relies on for data. The scope definition module can enable a user to specify a sub-part of an ontology. The query processing component can enable a parsing of queries expressed in SPARQL, a standardized query language for resource description framework (RDF) data. The storage manager can enable create, read, update, delete (CRUD) plus passing through reasoning functions.

The reasoning engine can include a taxonomy builder that infers implicit subclass and equivalence relationships between concepts, a consistency detection component that discovers any inconsistencies in an ontology, a relationship query component that answers questions about a relationship between ABox instances, and a membership query component that answers about types of various individuals.

The data store can be a RDF store.

In another aspect, the invention features a computer-implemented method of generating a simplified ontology including accessing an ontology, such as by loading an ontology from a store, and creating an abstraction of the ontology by performing at least one of the steps of eliminating relationships in the ontology, the eliminating relationships including an insertion of new relationships that simplify the ontology, eliminating individuals in the ontology, eliminating individuals including insertion of new individuals to simplify the ontology, eliminating concepts in the ontology, and generating the simplified ontology from the eliminating relationships, eliminating individuals and eliminating concepts.

In embodiments, the method can include generating an explanation to a user of how a specific inference is made by an ontology reasoner. The method can include compressing the ontology with the simplified ontology. The compressed ontology can track changes in the ontology.

The ontology can include OWL Web Ontology Language documents.

The method can include receiving a query, and determining a response to the query in conjunction with the simplified ontology.

The invention can be implemented to realize one or more of the following advantages.

A simplified ontology can be used for the purposes of explaining to a user how a specific inference was made by an ontology reasoner. Because the summarized graphs are succinct, it is easier for the user to determine how an inference was made rather than within the context of the larger ontology. A simplified ontology can be used for the purposes of interactive visualization of a large ontology at an abstract conceptual level.

A simplified ontology can be used for compressing the ontology, and using this compressed ontology to keep up with any changes in the ontology. This addresses an important problem for ontology reasoners, i.e., how to handle reason over changes in the ontology without having to re-inference over the entire ontology.

One implementation of the invention provides all of the above advantages.

Other features and advantages of the invention are apparent from the following description, and from the claims.

BRIEF DESCRIPTION OF THE DRAWINGS

The invention will be described in greater detail with reference to that appended figures in which.

Like reference numbers and designations in the various drawings indicate like features.

DETAILED DESCRIPTION

Figure 1:
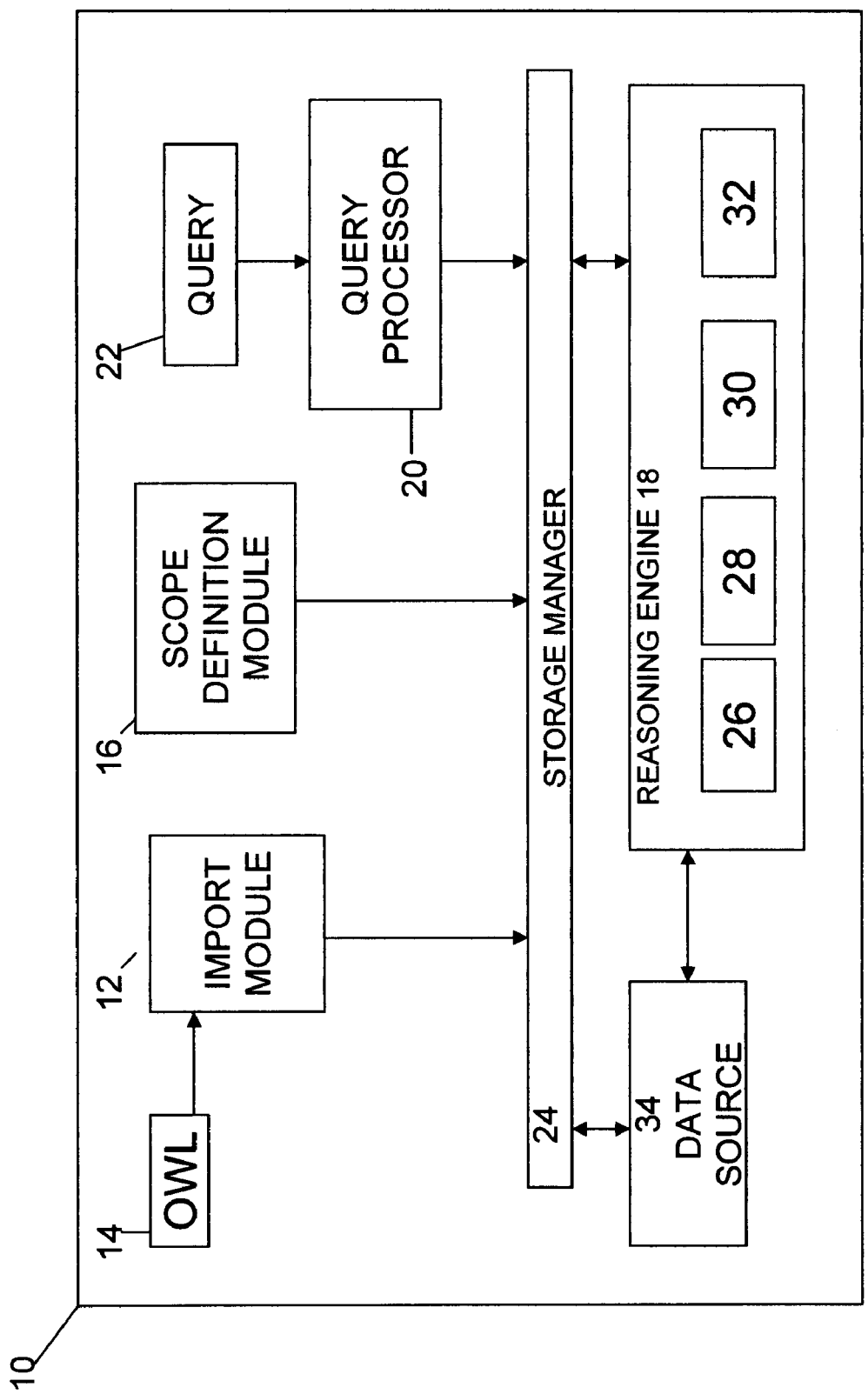
FIG. 1 is block diagram of an exemplary architecture for generating, simplifying and operating on ontologies.

As shown in FIG. 1, an architecture 10 as illustrated including the inventive reasoning engine having components for generating ontologies, simplifying ontologies, and operating on simplified ontologies in accordance with the present invention, in combination with optional components typically found in a digital computing environment adapted for dealing with large bodies of data which can be organized by ontologies. The illustrated architecture includes an import module 12. The import module 12 enables an import of OWL Web Ontology Documents 14 into a persistent store that the reasoner relies on for data. Implementation of the present invention does not require such import, as the invention can be practiced on existing ontologies as well as ontologies that are being built and/or revised with imported data.

The architecture 10 as illustrated includes a scope definition module 16 that can be optionally provided and enables the user to specify a sub-part of the ontology (if the ontology is modular), which is useful for scalability. For instance, a biologist interested in the cellular function portion of the GO ontology may define only a sub-portion of the GO ontology as being relevant to the scope. This helps in scaling a reasoning engine 18.

The architecture 10 as illustrated includes a query processing component 20 that, in accordance with one embodiment of the invention, enables the parsing of queries 22, such as queries expressed in SPARQL, a standardized query language for RDF data, to execute queries against the simplified ontologies. SPARQL has limited expressiveness (e.g., you cannot express additional assertions, or express cardinality constraints on a relation unless it is already specified as a constraint in the TBox), nor is there a mechanism to express a consistency query.

The architecture 10 as illustrated includes a storage manager 24 that is a representative storage component for use with the present invention and includes create, read, update, delete (CRUD) plus passing through reasoning functions.

The architecture 10 as illustrated includes the reasoning engine 18. The reasoning engine 18 includes a taxonomy builder 26 that infers implicit subclass and equivalence relationships between concepts for building an ontology as well as for simplifying an ontology.

The reasoning engine 18 includes a consistency detection component 28, which discovers any inconsistencies in the ontology and between an ontology and any simplified version of the ontology generated by the present invention.

The reasoning engine 18 includes a relationship query component 30, which answers questions about the relationship between ABox instances by performing consistency checks of the simplified ontology and by refining it.

The reasoning engine 18 includes a membership query component 32 that answers about the types of various individuals and may include a conjunctive query component (not illustrated) that answers questions about a combination of membership and relationship queries.

The architecture 10 as illustrated includes a data store 34 that is a persistent data repository, preferably an RDF store.

Artificial-Intelligence literature contains many definitions of an ontology; many of these contradict one another. For our purposes, an ontology is a formal explicit description of concepts in a domain of discourse (classes (sometimes called concepts)), properties of each concept describing various features and attributes of the concept (slots (sometimes called roles or properties)), and restrictions on slots (facets (sometimes called role restrictions)). An ontology together with a set of individual instances of classes constitutes a knowledge base. In reality, there is a fine line where the ontology ends and the knowledge base begins.

Classes are the focus of most ontologies. Classes describe concepts in the domain. For example, a class of wines represents all wines. Specific wines are instances of this class. The Bordeaux wine in the glass in front of you while you read this document is an instance of the class of Bordeaux wines. A class can have subclasses that represent concepts that are more specific than the superclass. For example, we can divide the class of all wines into red, white, and rose wines. Alternatively, we can divide a class of all wines into sparkling and non-sparkling wines.

Slots describe properties of classes and instances: Château Lafite Rothschild Pauillac wine has a full body; it is produced by the Château Lafite Rothschild winery. We have two slots describing the wine in this example: the slot body with the value full and the slot maker with the value Château Lafite Rothschild winery. At the class level, we can say that instances of the class Wine will have slots describing their flavor, body, sugar level, the maker of the wine and so on.

Figure 2:
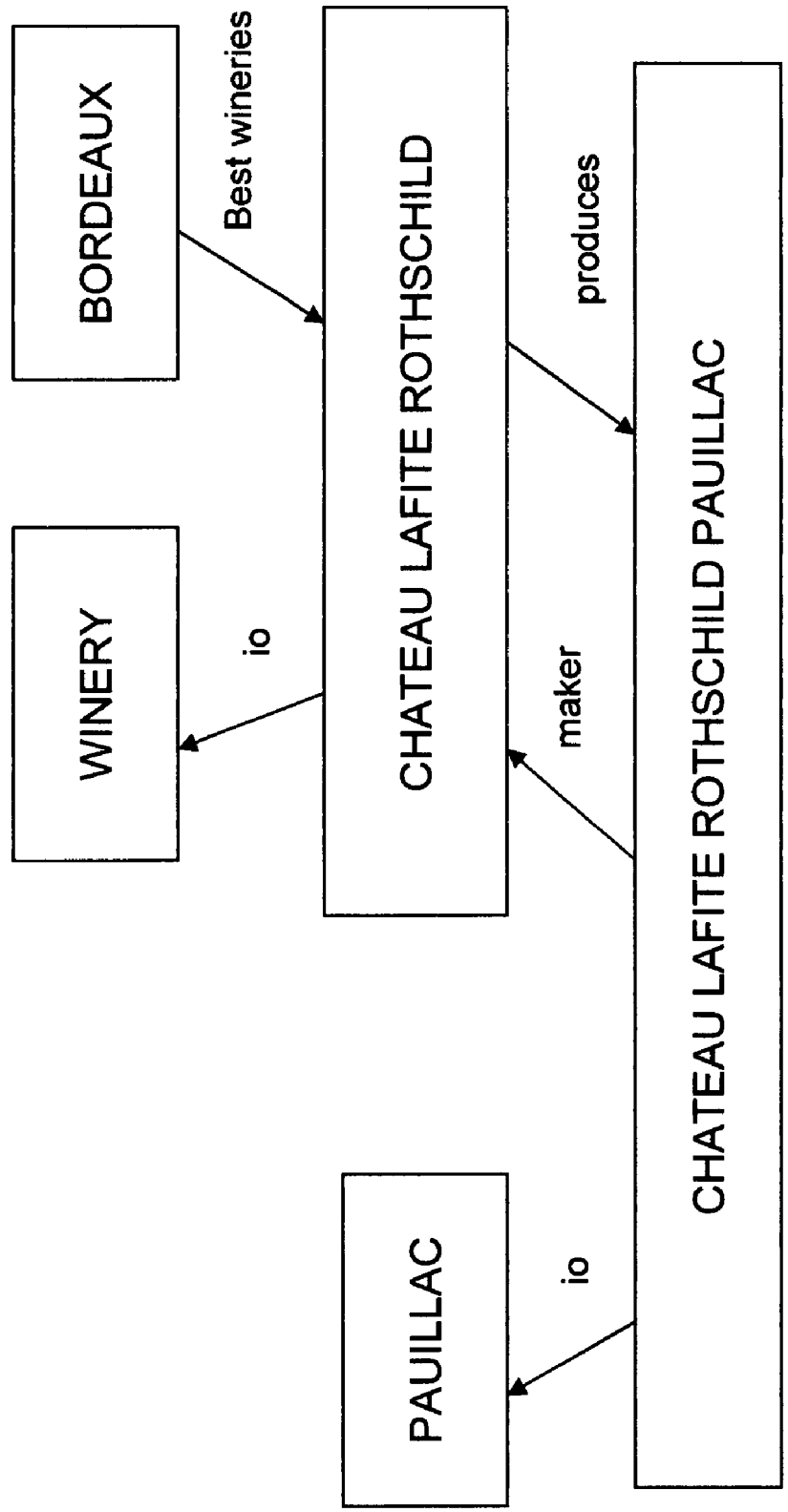
FIG. 2 is an exemplary domain.

As shown in FIG. 2, all instances of the class Wine, and its subclass Pauillac, have a slot maker the value of which is an instance of the class Winery. All instances of the class Winery have a slot produces that refers to all the wines (instances of the class Wine and its subclasses) that the winery produces.

In practical terms, developing an ontology includes defining classes in the ontology, arranging the classes in a taxonomic (subclass-superclass) hierarchy, defining slots and describing allowed values for these slots, and filling in the values for slots for instances.

We can then generate a knowledge base by defining individual instances of these classes filling in specific slot value information and additional slot restrictions.

Description Logic (DL) ontologies can be divided conceptually into two components: a Tbox and an ABox. The Tbox contains assertions about concepts or roles. The Abox contains role assertions between individuals and membership assertions. We describe various static analyses that can be applied in order to simplify an ABox graph on which a consistency check is to be performed. These simplifications are essentially edge removals (i.e., removing relationships that are irrelevant for reasoning for inconsistency detection) in order to reduce the size of the graph and to break it into non-connected sub-graphs that can be processed separately.

Figure 3:
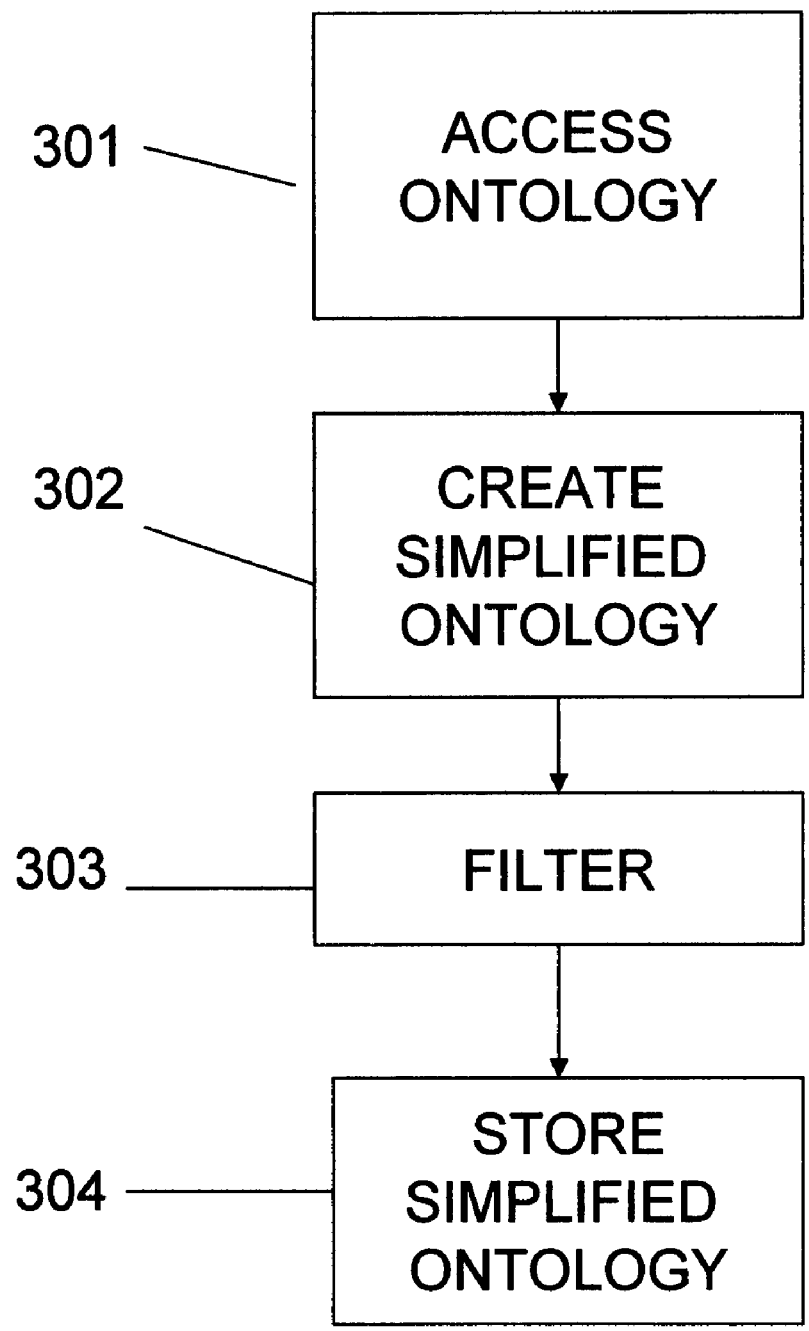
FIG. 3 illustrates a process flow for generating a simplified ontology in accordance with the present invention.

FIG. 3 illustrates a process flow for generating a simplified ontology in accordance with the present invention. As illustrated, the system first accesses an ontology at step 301. A previously-generated ontology may be accessed from a local data store or remote storage location. Alternatively, an ontology may be accessed by newly generating the ontology. Next, the ontology processing component, or reasoning engine, generates an abstraction of the ontology at step 302. Generating an abstraction of the ontology results in a simplified ontology. As further detailed below, the simplifying may include one or more of analyzing and simplifying relationships, concepts and individuals. The simplifying or eliminating of relationships in the ontology may include insertion of new relationships that simplify the ontology. Eliminating or collapsing individuals in the ontology may include insertion of new individuals to simplify the ontology. Eliminating or simplifying concepts in the ontology may include redefining and inserting new concepts to simplify the ontology. Additional filtering of the simplified ontology may be performed at step 303, as further detailed below. The simplified ontology which is generated is then stored at step 304 for future use in processing user inputs, such as queries. Two kinds of analyses for simplifying ontologies in accordance with the present invention are described in detail hereinafter. It is to be noted that the detailed description includes a first analysis which combines the steps of analyzing and simplifying relationships and concepts, while the second analysis involves analyzing and redefining individuals in the ontology. As noted above, one or a combination of the simplifications can be applied to implement the invention. First, pure T-RBox analyses only analyze concepts and roles defined in the TBox and RBox. They show that all edges in the ABox graph labeled with a given role are irrelevant for reasoning purpose.

Second, ABox analyses take into account the particular structure of a given ABox graph in order to discard more edges. The technique exploits a key observation about real world Aboxes, namely, similar individuals are related to other individuals in similar ways (e.g. fathers and mothers are related to their children by the hasChild role). Specifically, the present technique builds a summary Abox A0 of the original Abox A, by aggregating similar individuals and assertions. The advantages of the summary Abox A0 are: (a) A0 is dramatically smaller than A; (b) reasoning on A0 isolates a small relevant portion of A needed to obtain the correct answer; (c) A0 can be computed efficiently using straightforward relational database queries; (d) A0 can be maintained as changes occur to A, and is thus resilient to change; (e) A0 only needs to be computed once, and can be reused for answering subsequent queries. To isolate relevant portions of A for a specific reasoning task, efficient filtering techniques are introduced, as detailed below, that operate on A0 for the task of Abox consistency detection, although the approach can be generalized to query answering, as further detailed below.

In both cases detailed below, the correctness of the analysis is established by showing that the original ABox is consistent if the modified ABox is consistent. If the original ABox was inconsistent with the ontology, then the simplified ABox must also be inconsistent.

The description logic considered herein is OWL DL without nominals. For simplicity, we do not consider inverse functional properties. They can be dealt with by defining their inverse property as being a functional property. Furthermore, a cardinality restriction (e.g. cardinality(n, S)) is replaced by a maximum and a minimum cardinality restrictions with the same numeric value (=n S --> $\leq$n S $\sqcap$ $\geq$nS).

ABox Preprocessing

The static analyses described here assume that the consistency check is done on the ABox obtained after applying some preprocessing actions:

(1) If the domain of a role S is A and R(a, b) is in the Abox and R$\sqsubseteq$S then a: A (i.e. a is an instance of A) is added to the ABox if it was not already present.

(2) If the range of a role S is B and R(a, b) is in the ABox and R$\sqsubseteq$S then b: B (i.e. b is an instance of B) is added to the ABox if it was not already present (3) If the domain of a role S is A and R(a, b) is in the Abox and R has an inverse R' such that R'$\sqsubseteq$S then b: A (i.e. b is an instance of A) is added to the ABox if it was not already present.

(4) If the range of a role S is B and R(a, b) is in the ABox and R has an inverse R' such that R'$\sqsubseteq$S then a: B (i.e. a is an instance of B) is added to the ABox if it was not already present.

The correctness of the analyses described herein is not guaranteed if these four actions are not performed before removing edges.

The following two preprocessing actions are recommended, but not required:

(1) Nodes that are asserted to be identical are merged.

(2) If there exists three individuals a, b, c such that a is related to b and c through some functional property R (i.e. R(a, b) and R(a, c) ) then b and c are merged.

Pure T-RBox Analyses

Intuitively, an edge labeled R in the ABox is relevant for consistency check if, during the reasoning (more precisely during the application of tableaux rules), the presence of the edge can force new information to flow to its source node or target node. This may happen through one of two mechanisms:

(1) The presence in the source node of a universal restriction ($\forall$R. C) on a role R which is a super-role of the role labeling the edge. In this case, the role may play an important role during reasoning since it may be the channel through which the concept C may be propagated to its target node. (Note that with inverse role, information propagation may occur in the opposite direction: from the target to the source).

(2) The presence in the source node of a maximum cardinality restriction ($\leq$nR) may propagate new information to the target node through its merger with one or more of its siblings.

Definition: Given a TBox T and a RBox R, a role P is not involved in any universal restrictions iff there is no sub-concept $\forall$S. C of a concept in T such that P is a sub-role of S.

Definition: Given a TBox T and a RBox R, a role P is not involved in a maximum cardinality restriction iff there is no sub-concept $\leq$n S of a concept in T such that P is a sub-role of S.

Definition: Similar definitions for minimum cardinality and existential restriction.

Definition: Given a TBox T and a RBox R, a role P is not involved in any restrictions iff it is not involved in any universal or existential restrictions, or any maximum or minimum cardinality restriction.

Irrelevant and Inverse-relevant Roles:

(1) (Lemma A) A role R not involved in any restrictions and whose inverse, if defined, is also not involved in any restrictions is irrelevant. All edges labeled R in the ABox can safely be removed.

(2) (Lemma B): A role R whose inverse and itself are not involved in any universal restrictions and in any maximum cardinality restrictions is irrelevant (Note: cardinality restriction is translated into a maximum and minimum cardinality restriction with the same value constraint). All edges labeled R in the ABox can safely be removed.

(3) A role R not involved in any universal restrictions and in any maximum cardinality restrictions, but whose inverse is involved in such restrictions is inverse-relevant. All edges labeled R in the ABox cannot safely be removed just based on a T Box analysis.

ABox Analyses

Here we describe static analyses that take into account the particular structure of an ABox in order to remove irrelevant edges. Two types of analyses are described:

(1) Direct neighborhood analyses assume, very conservatively, that, during the tableaux expansion, all sub-expressions of concepts appearing in the ABox can reach any individual in the ABox. So in order to understand the effects of a particular edge only the direct neighbors of its source and target nodes need to be considered. These analyses are not expensive to perform, but in some cases can lead to very approximate results.

(2) Concept flow analyses attempt to provide for a given individual a much better approximation of the concepts that can reach it during the tableaux expansion. This information can then be used to further prune edges.

Direct Neighborhood Analyses

A better analysis of universal restrictions:

(1) (Lemma C) Let R be a role involved in n universal restrictions $\forall R1.A1, \ldots, \forall Rn.An$ and not involved in any maximum cardinality restrictions such that its inverse, if defined, is not involved in any universal restrictions and any maximum cardinality restrictions. In the ABox, an edge labeled R whose target node is explicitly asserted as being an instance of concepts $T1, \ldots, Tp$ can safely be removed if the following condition holds:

for all r in $\{1, \ldots, n\}$ there is k in $\{1, \ldots, p\}$ such that Tk is obviously subsumed 1 by Ar. This condition guarantees that, during the tableaux rule application, no new information (information that cannot be found otherwise) will be propagated to the target from source through the R edge.

for all S such that $R \sqsubseteq S$, S is not a transitive role (2) (Lemma D) Let R be a role involved in n universal restrictions $\forall R1.A1, \ldots, \forall Rn.An$ and whose inverse R' is defined and is involved in m universal restrictions $\forall R'1.B1, \ldots, \forall R'm.Bm$. Furthermore, both R and R' are not involved in any maximum cardinality restrictions. In the ABox, an edge labeled R whose target node is explicitly asserted to be an instance of concepts $T1, \ldots, Tp$ and whose source node is explicitly asserted to be an instance of concepts $S1, \ldots, Sq$ can safely be removed if the following conditions hold:

For all r in $\{1, \ldots, n\}$ there is k in $\{1, \ldots, p\}$ such that Tk is obviously subsumed by Ar.

For all S such that $R \sqsubseteq S$, S is not a transitive role

For all r in $\{1, \ldots, m\}$ there is k in $\{1, \ldots, q\}$ such that Sk is obviously subsumed by Br.

For all S such that $inv(R) \sqsubseteq S$, S is not a transitive role

These conditions guarantee that, during the tableaux rule application, no new information will be propagated to the target from source through the R edge or from the target to the source through the R edge as a consequence of a universal restriction on R'.

Analyzing Maximum Cardinality Restrictions

In the description above, no rules deal with roles involved in maximum cardinality restrictions. The static analysis of these roles is hard because of the ripple effect of mergers: if two nodes are merged, the number of edges of the merged node may increase, which can then lead to more mergers. Furthermore, these subsequent mergers can involve edges labeled with a role complete unrelated to the role label of the edges involved in the first merger. A simple static analysis of maximum cardinality can only be achieved when we can show that the ABox is such that neighbors of real individuals present in the ABox can never be merged.

Let R be a role involved in the maximum cardinality restriction $\leq nR$. During the tableaux expansion, two R-neighbors of a node N can be merged because of $\leq nR$ only if at some point during the tableaux expansion N has more than n R-neighbors and $\leq nR$ is in its list of concepts. In order to guarantee that no mergers can involve neighbors of real individuals in the ABox, we find an upper bound of the number of R-neighbors of all ABox individuals before the first merger involving neighbors of a real individual in the ABox (assuming that such merger happens). If this upper bound is less or equal to the maximum cardinality value for all R roles involved in maximum cardinality restrictions, no mergers involving individuals will ever occur. Therefore, an edge labeled R that was not removed by analyses described in previous sections because of the maximum cardinality on R can now safely be removed.

Upper Bound on the Number of R-neighbors

During the tableaux expansion, there are three kinds of R-neighbors of an individual i:

(1) Individuals i' in the ABox such that P(i, i') (explicit R-successors) such that $P \sqsubseteq R$ (2) Individuals i" in the ABox such that P'(i", i), where P' is the inverse of P and $P \sqsubseteq R$ (3) Pseudo-individuals psi that were not initially present in the ABox, but were generated by the application of the tableaux rules.

The number of individuals of type (1) and (2) can easily be obtained from the ABox. Since we assumed that nominals are not allowed, it follows that R-neighbors of type (3), before any mergers have occurred, can only be R-successors of i. Such individuals can be generated in two ways:

1. from rules that handle the presence in the list of concepts associated with i of a) existential restrictions involving sub-roles of R or b) minimum cardinality restriction involving sub-roles of R (note that a minimum cardinality that is incompatible with the maximum cardinality on the role R being considered can be ignored since, if both the minimum and maximum cardinality restrictions could reach i, they would lead to a clash in i. Therefore mergers between R-neighbors of i would not occur since the $\leq$-rule for $\leq nR$ would never be applied to i), or 2. from mergers between i and a child y of a pseudo individual x, such that x is a child of i as shown in FIG. 1. Furthermore, x was created by a generator ($\exists TC$ or $\geq mT$) such that that T is not a sub-role of R. Such mergers can make x a R-neighbor of i if the inverse of the set of role labels for the edge (x, y) contains a sub-role of R.

The upper bound on the number of pseudo-individuals c of type 1 (pseudo-individuals generated by a generator whose role is a sub-role of R) child of the real individual i. when considering possible mergers due to a maximum cardinality restriction $\leq nR$ in i is as follows:

card($\{\exists P.A \in clos(A) | P \sqsubseteq R$ and there is no ii$\in$Neighbor$_0$(i, P) s.t. B$\in L_0$(ii) and B is obviously subsumed by A$\})$+ Sum(($m | \geq mP \in clos(A)$ and $P \sqsubseteq R$ and $n \geq m$))

where clos(A) is the set of concepts that can appear in node labels during tableau. (the formal definition of clos(A) is given in Appendix A incorporated herein by reference)

$L_k(S)$ is the concept set associated with the individual s at the kth step of the tableau expansion algorithm Neighbor$_k$(i, P) is the set of P-neighbors of the individual i at the kth step of the tableau algorithm The upper bound on the number of pseudo-individuals x of type 2 (pseudo-individuals generated by a generator whose role is not a sub-role of R) child of the real individual i. when considering possible mergers due to a maximum cardinality restriction $\leq nR$ in i is as follows:

card($\{\exists T.A | \exists T.A \in clos(A)$ and not($T \sqsubseteq R$) and strict-d-attract(inv(T))$\neq \emptyset$ and S$\in$loose-attract(T) and $S \sqsubseteq R$ and there is no ii∈Neighbor$_0$(i, T) s.t. B∈L$_0$(ii) and B is obviously subsumed by A}+Sum(m|≧T∈clos(A) and not (T⊑R) and strict-d-attract(inv(T))≠{} and S∈loose-attract(T) and S⊑R)

where
strict-d-attract(P)={S|{P, S} ⊂ gen(clos(A)) and ≦n T∈clos(A) s.t. S⊑T and P⊑T}. Informally, S is an element of strict-d-attract(P) iff generators of P and S are in the TBox and there is a max cardinality restriction on T that can force the merger of a P-neighbor and a Q-neighbor. By the definition of a pseudo-individual of type 2 generated by a generator whose role is T, strict-d-attract(inv (T)) cannot be empty (otherwise the pseudo individual y child of x cannot be merged with the real individual i).
gen(ConceptSet)={Q|∃Q.A∈ConceptSet or ≧m Q∈ConceptSet}
loose-attract(P)=loose-d-attract(P)∪{Q|there is S such that Q∈loose-d-attract(S) and S∈loose-attract (P)}. loose-attract is a conservative version of the transitive closure of strict-d-attract (a role P and its inverse inv(P) are treated the same way).
loose-d-attract(P)={Q|(P∈gen(clos(A)) or inv(P)∈gen(clos (A))) and (Q ∈gen(clos(A)) or inv(Q)∈gen(clos(A))) and ≦n T∈clos(A) s.t. (Q⊑T and P⊑T) or (inv(Q)⊑T and P⊑T) or (Q⊑T and inv(P)⊑T) or (inv(Q)⊑T and inv (P)⊑T)}. Intuitively, loose-d-attract(P) is the union of strict-d-attract(P) with all the inverses of roles in strict-d-attract(P). Loose-d-attract therefore takes the conservative approximation here by taking roles and their inverses into account.

Lemma E:

For a real individual i of an ABox A (i.e. an individual present in A before the application of any tableau rule), at step k of the tableau algorithm before the first merger of neighbors of a real individual, the set Neighbor$_k^b$(i, R) of R-neighbors of i for a clash-free branch b of the non-deterministic tableau algorithm is such that:

if ≦n R∈L$_k$(i), then card(Neighbor$_k^b$(i, R))≦card(Neighbor$_0$(i, R))+card({∃P.A∈clos(A)|P⊑R and there is no ii∈Neighbor$_0$(i, P) s.t. B∈L$_0$(ii) and B is obviously subsumed by A})+Sum((m|≧mP∈clos(A) and P⊑R and n≧m))+card ({∃T.A|∃T.A ∈clos(A) and not(T⊑R) and strict-d-attract(inv (T))≠{} and S∈loose-attract(T) and S⊑R and there is no ii ∈Neighbor$_0$(i, T) s.t. B∈L$_0$(ii) and B is obviously subsumed by A}+Sum(m|≧m T∈clos(A) and not(T⊑R) and strict-d-attract (inv(T))≠{} and S∈loose-attract(T) and S⊑R)

Lemma F:

For an ABox A, if for all ≦nR∈clos(A), for real individual i in A, the following condition holds:

card(Neighbor$_0$(i, R))+card({∃P.A∈clos(A)|P⊑R and there is no ii ∈Neighbor$_0$(i, P) s.t. B∈L$_0$(ii) and B is obviously subsumed by A})+Sum((m|≧mP∈clos(A) and P⊑R and n≧m))+card({∃T.A|∃T.A∈clos(A) and not(T⊑R) and strict-d-attract(inv(T))≠{} and S∈loose-attract(T) and S⊑R and there is no ii∈Neighboro(i, T) s.t. B∈L$_0$(ii) and B is obviously subsumed by A}+Sum(m|≧m T∈clos(A) and not(T⊑R) and strict-d-attract(inv(T))≠{} and S∈loose-attract(T) and S⊑R)≦n then, during the tableau algorithm, no mergers between neighbors of real individuals can occur.

Theorem:

For an ABox A, if for all ≦nR∈clos(A), for real individual i in A, the following condition holds:

card(Neighbor$_0$(i, R))+card(({∃P.A∈clos(A)|P⊑R and there is no ii ∈Neighbor$_0$(i, P) s.t. B∈L$_0$(ii) and B is obviously subsumed by A})+Sum((m|≧mP∈clos(A) and P⊑R and n≧m))+card({∃T.A|∃T.A∈clos(A) and not(T⊑R) and strict-d-attract(inv(T))≠{} and S∈loose-attract(T) and S⊑R and there is no ii∈Neighbor$_0$(i, T) s.t. B∈L$_0$(ii) and B is obviously subsumed by A}+Sum(m|≧m T∈clos(A) and not(T⊑R) and strict-d-attract(inv(T))≠{} and S∈loose-attract(T) and S⊑R)≦n then all edges of A label with a role not involved in any universal cardinality restrictions and whose inverse is not involved in any universal cardinality restrictions can be safely removed from A Concept Flow Analyses During the tableaux expansion rules, a sequence of a boxes (A=A0, A1, . . . , An) are produced until a clash is found or a complete ABox An is produced. The goals of the concept flow analysis are as follows:

(1) Find an upper bound of the set of concepts that can flow to a given individual present in the initial ABox A. In other words, we need to build a function ML such that for each individual i in the initial ABox A, and for all k in {0, . . . ,n} Lk(i)⊂ML(i) (where Lk(i) is the set of concepts associated with individual i at the kth tableaux rule application)

(2) Find an upper bound of the number of neighbor(s, S), where s is an individual in A and neighbork(s, S)={t|(R(s, t)∈Ak or R'(t, s)∈Ak with R'=inv(R)) and R⊑S}. In other words, we need to build a function MNeighbor such that for each individual i in the initial ABox A, for all k in {0, . . . ,n} card(neighbork (i, S))≦MNeighbor (i, S)

The control flow analysis gives us (1) a better understanding of the concept that may reach a given individual and (2) a conservative upper bound on the number of neighbors of a given individual. These two pieces of information allow us to remove edges that were kept on the assumption, now invalidated, that certain concepts may reach certain individuals or that certain individuals may be merged.

Performing a control flow analysis on the original ABox may be very expensive if it does not fit in main memory. The analysis is performed on a summary of the original ABox. This ABox summary captures the general structure or schema of the ABox. The notion of ABox reduction formalizes the idea of ABox summary.

ABox Reduction Definitions

Definition: A labeled graph is a tuple (V, E, VLab, ELab, v1) where (1) V is a finite set of nodes, (2) VLab is a finite set of labels for nodes, (3) ELab is a finite set of labels for edges, (4) E, a subset of V*ELab*V, is a ternary relation describing the edges (including the labeling of the edges), (5) v1 is a complete function from V to VLab describing the labeling of the nodes and Definition: A generalized SHIN-ABox graph is a labeled graph G=(V, E, 2^Con, Roles, v1) such that (1) labels of vertices are subsets of a finite set Con of SHIN Concepts in the negation normal form NNF. Furthermore, clos(Con)=Con. The formal definition of clos is given in the Appendix A. Intuitively, Con is the set of concepts that can appear during the tableaux expansion of an Abox whose set of Tbox concept is a subset of Con.

(2) The set of edge labels, Roles, consists of SHIN roles and there is a partial order relation⊑on Roles.

Notation:
neighbor(s, S, E)={t|there is R such that (s, R, t)∈E and R⊑S}∪{t|there is R' such that (t, R', s)∈E and R' is the inverse of a role R such that R⊑S}
t is a S-neighbor(E) of s iff t∈neighbor(s, S, E)

Definition: A generalized SHIN-ABox graph reduction.

Given two generalized SHIN-ABox graphs G=(V, E, $2^C$, Roles, v1) and G'=(V', E', $2^{C'}$, Roles', v1'), a complete function f from V to V' is a reduction from G to G' iff all of the following hold:
(1) f(V)=V'
(2) C'=C and Roles'=Roles
(3) For all v∈V, v1(v)⊂v1'(f(v))
(4) For all v1 and v2∈$\overline{V}$ and R∈Roles, if (v1, R, v2) is in E then (f(v1), R, f(v2)) is in E'

Notation:
(1) For a concept in NNF C, clos(C) is formally defined in the Appendix A.
(2) For a SHIN-ABox A, clos(A) is formally defined in the Appendix A. It includes Union(clos(C) such that a:C∈A)

Definition: Canonical generalized SHIN-ABox graph of a SHIN ABox.

Given a SHIN-Abox A together with its TBox T and RBox R, its unique canonical generalized SHIN-ABox graph G=(V, E, $2^{clos(A)}$, Roles, v1) is defined as follows:
(1) V is the set of individual in the SHIN Abox A
(2) Roles is the set of roles defined in the RBox together with their inverse (3)
For all v1, v2∈V and R∈Roles, (v1, R, v2)∈E iff R(v1, v2) is in the ABox
(4) For v∈V, v1(v)={C|v:C is in the ABox A}

The idea of summary graph of an ABox A is captured by the reduction the canonical generalized SHIN-ABox graph of A.

Definition: The ABox A corresponding to a generalized SHIN-ABox graph G=(V, Ed, $2^{concepts}$, Roles, v1) and having all the equalities and inequalities derived from a set ES by a function f whose domain is a superset of V is the ABox with the following assertions {x: C|x∈V and C∈v1(x)}∪{P(x, y)|P∈Roles and (x, P, y)∈E}∪{same(f(x), f(y))|same(x, y)∈ES}∪{different(f(x), f(y))|different(x, y)∈ES}. Note that clos(A)⊆clos(concepts)(=concepts, by definition of SHIN-ABox graph)

Theorem 1: Let G=(V, Ed, $2^{clos(A)}$, Roles, v1) be the canonical generalized SHIN-ABox graph of a SHIN Abox A, and let f be a reduction from G to G'=(V', Ed', $2^{concepts'}$, Roles', v1'), then If the ABox A', which corresponds to G' and has all the equalities and inequalities derived from the set of equality and inequality assertions defined in A by f, is consistent then A is consistent.

The following algorithm performs the flow analysis.
Analysis Algorithm
Input: G0=(V0, E0, $2^{Con}$, Roles, v10) a generalized SHIN ABox graph G0
md=maximum depth of the completion trees (an integer greater or equal to 1)
Output: A pair (G, h) such that:
a. G=(V=V'∪V", E=E'∪E", $2^{Con}$, Roles, v1) is a weighted labeled graph
and b. h is a complete function from V0 to V
Initialization:
a. G->(V=V'∪V", E=E'∪E", $2^{Con}$, Roles, v1)
(Note: E" will have edges between two pseudo individuals, and edges between a real individual and a pseudo-individual. V" will have all the pseudo-individuals introduced by the algorithm)
b. V'->V0; V"-->{};E'-->E0; E"-->{}; v1-->v10
c. For all v∈V', initial (v)-->{v} (initial(x) keeps track of all the nodes that have been merged in x)
d. For all v∈V', depth(v)-->0 (corresponds to the depth of a node in the completion tree)

e. blocked-->{} (corresponds to the set of blocked pseudo-nodes. A pseudo-individual is blocked if it cannot influence its ancestors or be merged with a none-blocked node)
f. stopped-->{} (anode is stopped, if its descendants and itself will never be considered)
g. parent function maps pseudo individual to their parent in the completion tree
h. anc-or-self is the reflexive transitive closure of parent
Apply the following rules until no one can be applied:
(1) If
a. s∉blocked and anc-or-self(s)∩stopped=∅, and
b. C1⊓C1∈v1(s), and
c. {C1, C2} is not included in v1(s)
then v1(s)-->v1(s)∪{C1, C2}
(2) if
a. s∉blocked and anc-or-self(s)∩stopped=∅, and
b. C1⊔C2∈v1(s), and
c. {C1, C2} is not included in v1(s)
then v1(s)-->v1(s)∪{C1, C2}
(3) if
a. s∉blocked and anc-or-self(s)∩stopped=∅, and
b. ∀S.C∈v1(s), and
c. there is an S-neighbor(E) t of s with C∉v1(t), and
d. t∉blocked
then v1(t)-->v1(t)∪{C}
(4) if
a. s∉blocked and anc-or-self(s)∩stopped=∅, and
b. ∀S.C∈v1(s), and
c. there is some transitive role R and R⊑S, and
d. there is a R-neighbor(E) t of s such that ∀R.C∉v1(t), and
e. t∉blocked
then v1(t)-->v1(t)4{ . . . R.C}
(5) if
a. s∉blocked and anc-or-self(s)∩stopped=∅, and
b. ∃S.C∈v1(s), and
c. there is no t S-neighbor(E) of s such that C∈v1(t), and
d. depth(s)<md
then
a. create a new node t in V" (i.e V"-->V"∪{t}), and
b. E"-->E"∪{(s, S, t)}, and
c. E-->E'∪E", and
d. v1(t)-->{C}, and
e. depth(t)-->depth(s)+1
f. parent(t)-->s
g. if (!childMayBeMergedWithNoneBlockedIndiv(s, S) and !childMayInfluenceAnc(s, S) then blocked--> blocked∪{t}
(Note the formal specifications of childMayBeMergedWithNoneBlockedIndiv and childMayInfluenceAnc are given after the this set of "static tableau rules")
(6) if
a. s∉blocked and anc-or-self(s)∩stopped=∅, and
b. ≧n S∈v1(s), and
c. there is no S-neighbor(E) of s, and
d. depth(s)<md
then
a. create a new node t in V" (i.e V"-->V"∪{t}), and
b. E"-->E"∪{(s, S, t)}, and
c. E-->E'∪E", and
d. depth(t)-->depth(s)+1
e. parent(t)-->s
f. if (!childMayBeMergedWithNoneBlockedIndiv(s, S) and !childMayInfluenceAnc(s, S)) then blocked--> blocked∪{t}
(7) if
a. s∉blocked and anc-or-self(s)∩stopped=∅, and
b. ≦n S∈v1(s), and c. card(neighbor(s, S, E))>1, and
d. depth(s)<md
then
  a. N-->neighbor(s, S, E)
  b. choose x in N. if N has real individuals, x must be a real individual (i.e. depth(x)=0). If N has a parent of s, then x must be chosen among the parents of s. (Note that if N has at least one real individual and at least one parent of s, then all parents of s present in N are also real individuals. A real individual i is the parent of a real individual ii iff there is R such that (i, R, ii)∈E)
  c. initial(x)-->Union(initial(y)|y∈N)
  d. v1(x)-->Union(v1(y)|y∈N)
  e. stopped-->stopped∪{y|y∈N and y≠x}
  f. A'-->{(t, R, y)|(t, R, y)∈E' and y∈N−{x}}∪{(y, R, t)|(y, R, t)∈E' and y∈N−{x} and depth(y)=0})
  g. E'-->(E'−A')
∪{(x, inv(R), t)|(t, R, y)∈E' and y∈N−{x} and (depth(y)>0 and x∈anc-or-self(y))}
∪{(t, R, x)|(t, R, y)∈E' and y∈N−{x} and (depth(y)=0 or x∈anc-or-self(y))}
∪{(x, R, t)|(y, R, t)∈E' and y∈N−{x} and depth(y)=0}
(Note that. for the second set, t=s because, since y is pseudo-individual, y has a single parent)
  h. A"-->{(t,R,y)|(t,R,y)∈E" and y∈N−{x}}∪{(y,R,t)|(y,R,t)∈E" and y∈N−{x} and depth(y)=0})
  i. E"-->(E"−A")
∪{(x, inv(R), t)|(t, R, y)∈E" and y∈N−{x} and (depth(y)>0 and x∈anc-or-self(y))}
∪{(t, R, x)|(t, R, y)∈E" and y∈N−{x} and (depth(y)=0 or x∈anc-or-self(y))}
∪{(x, R, t)|(y, R, t)∈E" and y∈N−{x} and depth(y)=0}
  j. E-->E'∪E"

(8) If
  a. s∉blocked and anc-or-self(s)∩stopped=∅, and
  b. (depth(s)=md) or (depth(s)=md−1), and
  c. clos(v1(s)) is not included in v1(s),
then
  a. v1(s)-->clos(v1(s))

Note: this rule ensures that when we reach the maximum depth (i.e. the tree expansion stops), we have a correct conservative approximation of the upper-bound of the concept set of s. This also needs to be applied at level md−1 to compensate for the second effect of ≦-rule.

(9) If
  a. s∉blocked and anc-or-self(s)∩stopped=∅, and
  b. depth(s)=md−1, and
  c. there is x∈neighbor(s, E) and x∉blocked and depth(x)=md, and
  d. a role Q such that Q∈gen(v1(x))∪inv(gen(v1(x))) and (s, inv(Q),x)∉E
then
  a. E"-->E"∪{(s, inv(Q),x)}, and
  b. E-->E'∪E"

Note: This rule takes into account the second effect of ≦-rule when the maximum depth is reached in the children of s. Without this rule, we may not include in the set of edge labels between s and its children, additional labels coming from the second effect of ≦-rule.

(10) if
  a. s∉blocked and anc-or-self(s)∩stopped=∅, and
  b. there is a S-neighbor(E) of s, and
  c. the domain of S is specified, and
  d. domain(S)∉v1(s)
then v1(s)-->v1(s)∪{domain(S)}

(11) if
  a. s∉blocked and anc-or-self(s)∩stopped=∅, and
  b. there is a S-neighbor(E) of s, and
  c. S is a functional role, and
  d. ≦1S∉v1(s)
then v1(s)-->v1(s)∪{≦1S}

(12) if a. s∉blocked and anc-or-self(s)∩stopped=∅, and
  b. t is a S-neighbor(E) of s, and
  c. t∉blocked, and
  d. the range of S is specified, and
  e. range(S)∉v1(t)
then v1(t)-->v1(t)∪{range(S)}

(13) if
  a. s∉blocked and anc-or-self(s)∩stopped=∅, and
  b. C⊑D is in the unfoldable component of the TBox, and
  c. C∈v1(s) and D∉v1(s)
then v1(s)-->v1(s)∪{D}
(lazy unfolding rule)

(14) If
  a. s∉blocked and anc-or-self(s)∩stopped=∅, and
  b. C≡D is in the unfoldable component of the TBox, and
  c. C∈v1(s) and D∉v1(s)
then v1(s)-->v1(s)∪{D}
(lazy unfolding rule)

(15) If
  a. s∉blocked and anc-or-self(s)∩stopped=∅, and
  b. C≡D is in the unfoldable component of the TBox, and
  c. ¬C∈v1(s) and ¬D∉v1(s)
then v1(s)-->v1(s)∪{¬D}
(lazy unfolding rule)

(16) if a. s∉blocked and anc-or-self(s)∩stopped=∅, and
  b. UC!=null (i.e. Tg. is not empty)
  c. UC∉v1(s)
then v1(s)-->v1(s)∪{UC}

(17) if
  a. s∈blocked and anc-or-self(s)∩stopped=∅, and
  b. there is S such that s is a S-neighbor of parent(s) (note since only pseudo-individual can be blocked, parent(s) is well defined), and
  c. childMayBeMergedWithNoneBlockedIndiv(parent(s), S) or childMayInfluenceAnc(parent(s), S)
then blocked-->blocked−{s}
(note that once a pseudo-individual has been unblocked, it will remain unblocked until the end of the execution)

This is a simple unblocking mechanism such that once a node is unblocked, it will remain unblocked until the completion of the algorithm.

Finalization:
  a. For all v∈V0, h(v)-->x such that v∈initial(x) and x∉stopped (Note: In appendix, Lemma I establishes that x exists and is unique)

childMayBeMergedWithNoneBlockedIndiv(Node s, Role S)
Return true iff there is a R-neighbor t of s such that
  a. t∉blocked, and
  b. there is ≦n T∈v1(s), and
  c. S⊑T and R⊑T childMayInfluenceAnc(s, S)
If there is no T such that S⊑T and inverse of T is defined return false
If following two conditions hold
1. there is no T such
  a. S⊑T, and
  b. there is a ∀Q.C∈clos(A) such that inv(T)⊑Q
2. strict-d-attract(inv(S))={}
return false
otherwise return true Theorem 2:

Let A be SHIN ABox, let GA be its canonical generalized SHIN-ABox graph GA, let G0 be a generalized SHIN-ABox graph G0 and g0 a reduction from GA to G0, let (G, h) such that (G=(V, E=E'∪E", 2^Con, Roles, v1), h)=AnalysisAlgorithm(G0), let (A0=A, A1, . . . , An) a sequence of SHIN ABoxes derived from the application of the tableaux expansion rules to A, for all k∈{0, . . . , n}, for all i∈A0: Lk(i) ⊂ v1(h(g0(i))), where Lk (i) is the label associated with i in the Abox Ak.

Figure 4:
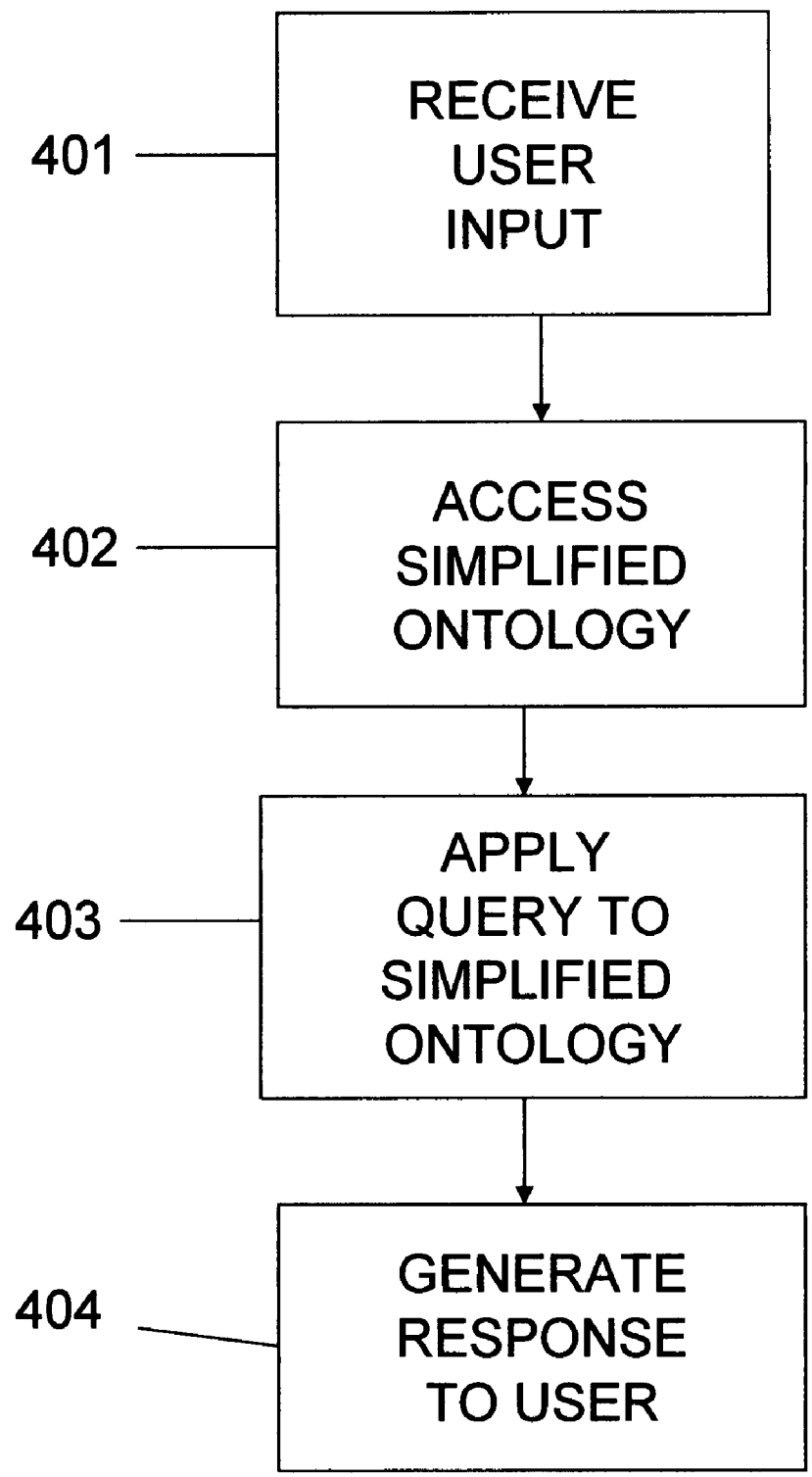
FIG. 4 illustrates a process flow for operating on a simplified ontology in accordance with the present invention.

It has been demonstrated that summarization can be used to scale instance retrieval to large expressive ABoxes in databases. Once the summarized ABoxes have been obtained, user input can be addressed as shown in FIG. 4. User input may simply be a request to understand the reasoning associated with creating the ontology or may be executing a query against the ontology. Before processing any queries, the summary Abox A0 is created from an original Abox A and stored it in a database, as detailed with reference to FIG. 3. The summary ABox is created by aggregating individuals which are members of the same concepts. Query processing is performed on A0 rather than A. By testing an individual in the summary Abox, all individuals mapped to the summary are effectively tested at the same time. FIG. 4 shows the steps of receiving user input at step 401, accessing the simplified ontology at step 402, analyzing the simplified ontology at step 403 and generating a response to the user at 404.

For query processing, however, consistency of the ontologies is required to have confidence in the query results. For a tested individual s in A0, if the summary is found to be consistent, then it is known that all individuals mapped to that summary individual s are not solutions. But if the summary is found to be inconsistent, it is possible that either (a) a subset of individuals mapped to the summarized individual s are instances of the query or (b) the inconsistency is a spurious effect of the summarization. Accordingly, the above-mentioned filtering, or refinement, is used to selectively expand the summary ABox to make it more precise. Refinement is an iterative process that partitions the set of individuals mapped to a single summary individual and remaps each partition to a new summary individual. The iteration ends when either the expanded summary is consistent, or it can be shown that all individuals mapped to the tested summary individual are solutions. Significantly, convergence on the solution is based only on the structure of the refined summary, without testing individuals in A.

Figure 5:
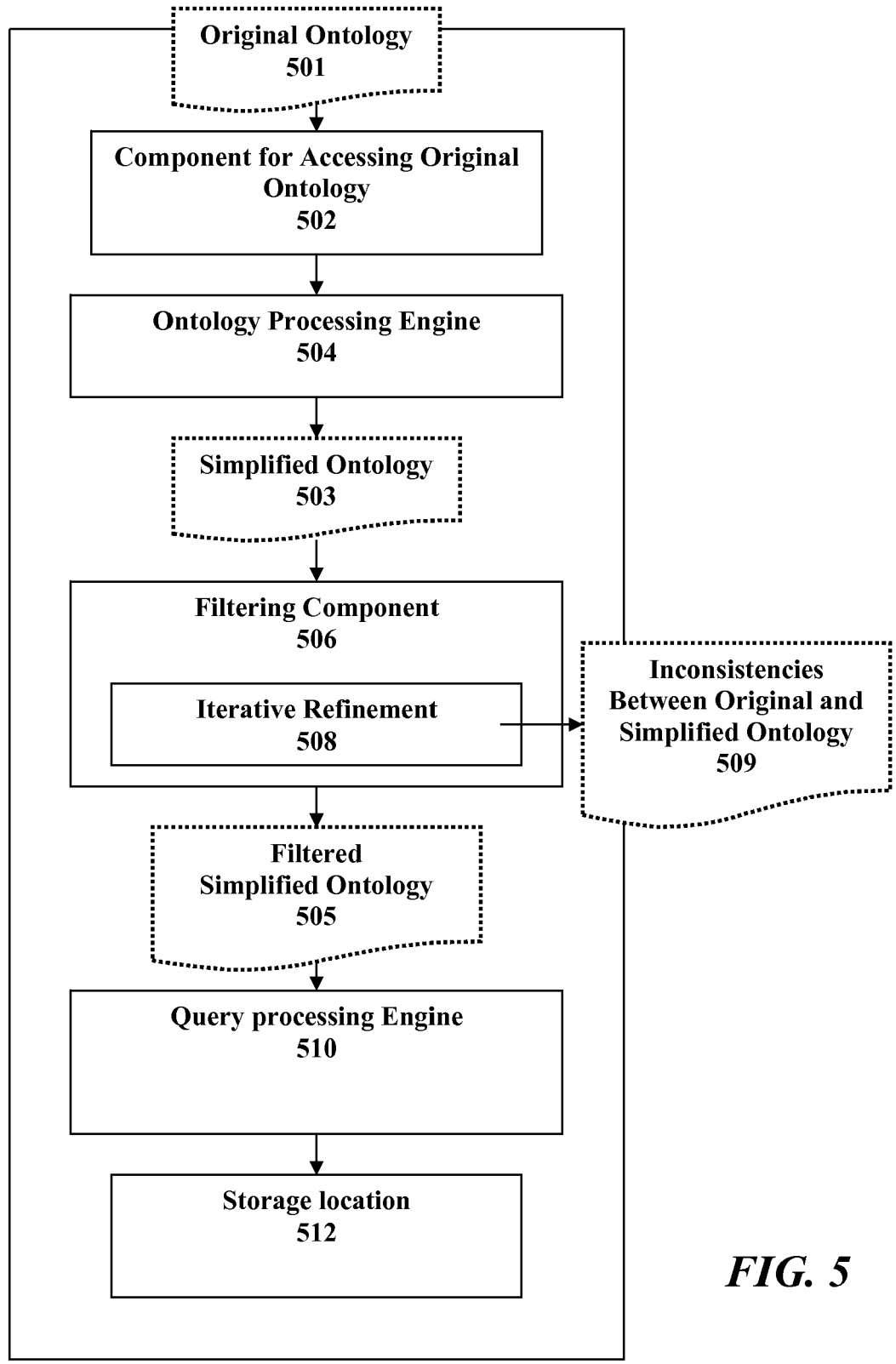
FIG. 5 is a block diagram of an apparatus for generating a simplified ontology in accordance with the present invention.

Referring to FIG. 5 there is shown a simplified block diagram of an apparatus 500 configured for generating a simplified ontology using refinement techniques. Also shown are the inputs and outputs to/from the apparatus 500. The apparatus 500 includes a component 502 for accessing the original ontology 501. Once the original ontology 501 is accessed, an ontology processing engine 504 creates an abstraction of the original ontology as a simplified ontology 503. A filtering component 506 applies filtering or refinement techniques to the simplified ontology 503 for creating a filtered simplified ontology 505. The filtering component 506 incorporates an iterative refinement component 508 for iteratively refining the filtered simplified ontology 505 to identify inconsistencies 509 between the original ontology 501 and the filtered simplified ontology 505. A query processing engine 510 executes a query against the filtered simplified ontology 505. The filtered simplified ontology 505 and any inconsistencies 509 found between it and the original ontology 501 are stored in a storage area 512.

With this summarize-and-refine technique, it is critical to have an effective refinement strategy, which limits both the number of refined individuals and the number of iterations. The refinement strategy is based on identifying justifications in the summary ABox, which is a minimal inconsistent subset of the summary, and selectively applying refinement to individuals in justifications. Multiple individuals in the summary are tested at the same time, and multiple justifications are processed at each refinement step. It is to be noted that the refinement/filtering step can be performed after creating the simplified ontology and before storing same, as shown in FIG. 3 or can be performed after accessing the simplified ontology and prior to query processing in FIG. 4. In addition to guiding refinement, justifications are helpful for users to understand query results. Since the explanations are at a summarized level, the information is more useful than detailed information about each individual in an ABox. Our summarize-and-refine technique can be used by any tableau reasoner to achieve scalability.

Refinement increases the size and precision of the summary, and preserves the summary ABox properties. The preferred strategy is to refine only individuals that are part of a summary ABox justification, where a justification is the minimal set of assertions which, when taken together, simply a logical contradiction, thus making the entire ABox inconsistent. In some cases, inconsistencies disappear through refinement. Otherwise, when a justification J is precise, it is known that the process has converged on a solution. That is, there is a tested individual s in J, such that all of the individuals in the image of s are instances of the query. A tested individual s is tested in J for query Q if s: :Q is an assertion in J.

In the worst case, iterative refinement can expand a summary Abox into the original Abox, so an effective refinement strategy is critical. The refinement step for an individual s in a justification J is as follows. For each a in the image of s, define key(a) with respect to J to be the set of role assertions in J for which a has a corresponding role assertion in the original A. To refine s, its image is partitioned so that all individuals in a partition have the same key with respect to J. Each partition is mapped to a new summary individual, creating a refined summary ABox. Conversely, if all individuals in A mapped to a summary individual s have the same key with respect to J, then s is precise with respect to J. Thus, justification-based refinement leads to precise justifications in subsequent iterations.

In general, there can be multiple justifications corresponding to different inconsistencies. The justification refinement order is important. For example, it is generally best to refine simple justifications first, and leave complex situations to the end, in which case the complexity disappears or becomes less expensive. Here are some sample heuristics:

A single refinement candidate s may belong to multiple justifications. In such a case, its key is defined to be the set of role assertions in all justifications that s belongs to. However, this can lead to a large number of key combinations, and to needless partitioning. Therefore, preference is given to justifications that have no overlap.

If there are two tested individuals in J, it is possible that the inconsistency is due to the interaction between two :Q type assertions. Therefore the refinement of such justifications is delayed until no other justifications are left in the summary, when it is more efficient to test each of these individuals separately.

Once a given J has been selected for refinement, its transformation is preferably tracked in successive iterations to avoid recomputation overhead, and to reach a conclusion as quickly as possible.

If the canonical summary ABox is inconsistent due to spurious inconsistencies, the inconsistencies are removed through refinement before processing any query.

A technique called tableau tracing can be used to compute justifications efficiently. This technique involves extending a tableau reasoner to track the axioms responsible for the firing of each expansion rule. However, to implement the refinement strategy, it is desirable to find as many justifications as possible at each refinement step. For this purpose, Reiter's Hitting Set Tree (HST) algorithm is preferable for recursively removing axioms from justifications so that new justifications can be found. However, since Reiter's approach is an exponential search algorithm, a threshold is imposed on the search. Therefore a subset of the justifications is found in a refinement step, and more are discovered in subsequent iterations.

As an optimization, similarities among justifications by forming justification patterns. Given a particular justification J for the inconsistent summary, it can be generalized it into a justification pattern by expressing it as a SPARQL query where individuals are treated as variables. Note that we do not consider any of the Tbox or Rbox axioms in J while creating this query. The query is executed against the summary ABox using a SPARQL engine to retrieve other isomorphic justifications, and then add the Tbox and Rbox axioms from J to each query result individually, to obtain valid new justifications. Since this SPARQL query does not require any inferencing, the queries are fast. This optimization dramatically reduces the time taken to find additional similar justifications that would normally have been found one at a time as part of the exponential Reiter's search.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

APPENDIX A

Preliminary Comments

The definition of a tableau for A assumes, without loss of generality, that, for all concept assertions a: C in A, C is in the negation normal form (NNF).

For a concept C in NNF, clos(C) is defined as the smallest set containing C and closed under sub-concept and negation. clos(A) is defined as the union of clos(C) for all concepts C appearing in A Definition: Define a tableau T for an Abox A w.r.t. a role hierarchy RH as a tuple (S, L, E, I) such that S is a non-empty set, $L:S \rightarrow 2^{clos(A)}$ maps each element in S to a set of concepts, $E:R_A \rightarrow 2^{S*S}$ maps each role to a set of pairs of elements in $S(R_A$ is the set of roles appearing in A), and $I:I_A \rightarrow S$ maps individuals appearing in A to elements of $S(I_A$ is the set of individuals appearing in A)

Furthermore, Horrocks et al. specify 14 properties that must be satisfied by the tuple (S, L, E, I).

In the remainder of this section, we present some adaptation of this definition to be applicable in practice to OWL without nominal.

1. In OWL qualified cardinality restrictions are not allowed. So we should consider SHIN, the subset of SHIQ without qualified cardinality restrictions, instead of SHIQ. Property (P11) (if $\geq$n R C∈L(s) or $\leq$n R C∈L(s) and (s, t)∈E(R) then C∈L(t) or NNF($\neg$C)∈L(t)) is only applicable to qualified cardinality restriction. So in the context of SHIN, a tableau for a SHIN ABox is not required to satisfy it (actually, if we consider $\geq$n R as a short-hand for $\geq$n $R_T$, it is always trivially satisfied). Furthermore P10 and P9 are slightly modified as follows:

(P9) if $\leq$n P∈L(s) then card({t∈S|(s, t)∈E(P)})$\leq$n
   (P10) if $\geq$n P∈L(s) then card({t∈S|(s, t)∈E(P)})$\geq$n Since, (P11) was the only property that introduced concept negations, there is no need to require, for a concept C, clos(C) to be closed under concept negation.

2. In practice it is highly inefficient to reduce reasoning over an ABox w.r.t. a TBox and a role hierarchy RH to reasoning over a modified ABox w.r.t. RH through the internalization of all the TBox axioms. In practice, the TBox is split into two parts: an unfoldable part $T_u$ and non-foldable part $T_g$ containing general concept inclusions (GCI). The internalization process is only applied to axioms in $T_g$ if it is not empty. If $T_g$ is not empty, all the axioms in $T_g$ are internalized using the universal concept $C_{T_g}$. In order to deal with the unfoldable part through lazy unfolding, the tableau definition for a ABox A w.r.t.

a TBox $T=T_u \cup T_g$ and w.r.t. a role hierarchy is obtained by adding the following properties:

(P15) if $C \in L(s)$ and there is $C \sqsubseteq D$ in $T_u$, then $D \in L(s)$
(P16) if $C \in L(s)$ and there is $C \equiv D$ in $T_u$, then $D \in L(s)$
(P17) if $\neg C \in L(s)$ and there is $C \equiv D$ in $T_u$, then $\neg D \in L(s)$
(P18) if $T_g$ is not empty, then $C_{Tg} \in L(s)$ 3. The notion of domain and range of roles in OWL is captured by requiring a tableau for A to satisfy the following properties:

(P19) if domain of R is defined and $(s, t) \in E(R)$, then domain$(R) \in L(s)$,
(P20) if range of R is defined and $(s, t) \in E(R)$, then range$(R) \in L(t)$ 4. To take into account "same" assertion in OWL ABox, we add the following property:

(P21) if same$(a, b) \in A$, $I(a)=I(b)$

5. Finally, 2) and 3) add properties that introduce new concepts in L(s), so we need to extend the definition of clos(A). clos(C) w.r.t. a TBox T and a role hierarchy is now defined as the smallest set X containing C, closed under sub-concept and such that:

a. if $A \in X$ and there is $A \sqsubseteq B$ in $T_u$, then $B \in X$,
b. if $A \in X$ and there is $A \equiv B$ in $T_u$, then $B \in X$
c. if $\neg A \in X$ and there is $A \equiv B$ in $T_u$, then $\neg B \in X$
d. if ($\exists R.A \in X$ or $\geq nR \in X$) and $R \sqsubseteq S$ and the domain of S is specified, then domain$(S) \in X$
e. if ($\exists R.A \in X$ or $\geq nR \in X$) and $R \sqsubseteq S$ and the range of S is specified, then range$(S) \in X$
f. if ($\exists R.A \in X$ or $\geq nR \in X$) and inv$(R) \sqsubseteq S$ and the domain of S is specified, then domain$(S) \in X$
g. if ($\exists R.A \in X$ or $\geq nR \in X$) and inv$(R) \sqsubseteq S$ and the range of S is specified, then range$(S) \in X$
h. $\forall S.C \in X$ and there is a role R such that $R \sqsubseteq S$ and R is transitive, then $\forall R.C \in X$ (this rule is necessary in order to ensure that if property (P6) requires $\forall R.C$ to be in L(t), $\forall R.C$ is in fact an element of clos(A) to comply with the definition of L: $S \to 2^{clos(A)}$. This detail was missing from [SHIQAbox]) clos(A) w.r.t. T and RH is defined as Union(clos(C)|a: C is in A)$\cup \{C_{Tg}\} \cup$ Union(clos(domain(S))|R(a, b) appears in A and $R \sqsubseteq S$ and domain(S) is defined)$\cup$
Union(clos(range(S))|R(a, b) appears in A and $R \sqsubseteq S$ and range(S) is defined)$\cup$
Union(clos(range(S))|R(a, b) appears in A and inv$(R) \sqsubseteq S$ and range(S) is defined)$\cup$
Union(clos(domain(S))|R(a, b) appears in A and inv$(R) \sqsubseteq S$ and domain(S) is defined)

Theorem: A SHIN-DR ABox A is consistent w.r.t. a TBox T and a role hierarchy RH if there is a tableau for A. SHIN-DR stands for the description logic SHIN with domain and range specification for roles.

A tableau algorithm can build a finite completion forest from which a possibly infinite tableau is derived. The algorithm applies a set of rules until no one can be applied. Only $T_g$ is internalized and the lazy unfolding is achieved by adding the following rules:

(RA) if $C \in L(s)$ and there is $C \sqsubseteq D$ in $T_u$ and $D \notin L(s)$, then $L(s) \to L(s) \cup \{D\}$
(RB) if $C \in L(s)$ and there is $C \equiv D$ in $T_u$ and $D \notin L(s)$, then $L(s) \to L(s) \cup \{D\}$
(RC) if $\neg C \in L(s)$ and there is $C \equiv D$ in $T_u$ and $\neg D \notin L(s)$, then $L(s) \to L(s) \cup \{\neg D\}$
(RD) if $T_g$ is not empty and $C_{Tg} \notin L(s)$, then $L(s) \to L(s) \cup \{C_{Tg}\}$ To take into account range and domain specifications, the following rules are added:

(RE) If there is a S-neighbor of s and the domain of S is specified and domain$(S) \notin L(s)$, then $L(s) \to L(s) \cup \{$domain$(S)\}$
(RF) If t is a S-neighbor of s and the range of S is specified and range$(S) \notin L(t)$, then $L(t) \to L(t) \cup \{$range$(S)\}$ Proof of Pruning Lemmas For the proof of all pruning lemmas, let A be the original ABox and A' be the Abox obtained after removing the assertion R(a, b). Furthermore A' is such that:

1) if the domain of a role S is D and $R \sqsubseteq S$, then a: D is A' (i.e. a is an instance of D)
2) if the range of a role S is B and $R \sqsubseteq S$, then b: B is in A'
3) if the domain of a role S is D and inv$(R) \sqsubseteq S$, then b: D is A'
4) if the range of a role S is B and inv$(R) \sqsubseteq S$, then a: B is A'

Note that these 4 conditions ensure that clos(A)=clos(A').

We want to prove that A is consistent w.r.t. a TBox $T=T_u \cup T_g$, a role hierarchy RH iff.
A' is consistent w.r.t. T and RH.

Lemma A: A role R not involved in any restrictions whose inverse, if defined, is also not involved in any restrictions is irrelevant. All edges labeled R in the ABox can safely be removed.

The precise definition of a role not involved in any restrictions w.r.t. an Abox A is as follows Definition: A role R is not involved in any restrictions w.r.t. an Abox A, a TBox T and a role hierarchy RH iff there is no $\forall S.C$ or $\exists S.C$ or $\geq n S$ or $\leq n S$ in clos(A) such that $R \sqsubseteq S$.

Proof:

A) If A' is consistent w.r.t. T and RH, then there is a tableau T'=(S', L', E', I') for A'.

Let T=(S, L, E, I) be such that S=S', L'=L, I'=I and E' is such that for a role P:

1. if $R \sqsubseteq P$, then $E(P)=E'(P) \cup \{(I(a), I(b))\}$
2. if $R \sqsubseteq P$, then $E(inv(P))=E'(inv(P)) \cup \{(I(b), I(a))\}$
3. otherwise $E(P)=E'(P)$.

We show that T is a tableau for A (and therefore that A is consistent) by proving that T satisfies all the 21 constraints on a tableau.

(P1), (P2), (P3), (P15), (P16), (P17) and (P18) are satisfied because S=S' and L=L' and T' is a tableau (P4), (P5), (P6), (P9) and (P10)
Case 1: if the considered role S is not R, inv(R), a super-role of R or the inverse of a super-role of R, then, since E(S)=E'(S), L=L', S=S' and T' is a tableau of A', it follows that (P4), (P5), (P6), (P9) and (P10) are satisfied.
Case 2: if the considered role S is either equal to R, inv(R), a super-role of R or the inverse of a super-role R, by the definition of a role not involved in any restriction, there is no $\forall S.C$ or $\exists S.C$ or $\geq n S$ or $\leq n S$ in clos(A) (=clos(A')). Since, for all s$\in$S, $L(s)=L'(s) \subset$ clos(A), (P4), (P5), (P6), (P9) and (P10) are trivially satisfied because their if-condition is always false.)

(P7)
Case 1: if the considered role S is not R, inv(R), a super-role of R or the inverse of a super-role of R, then, since E(S)=E'(S), E(inv(S))=E'(inv(S)), L=L' and T' is a tableau of A', it follows that (P7) is satisfied.
Case 2: if the considered role S is R or a super-role of R, then, by the definition of E, (x, y)$\in$E(S) iff. ((x,y)$\in$E'(S) or (x,y)=(I(a), I(b))). Since T' is a tableau, (x, y)$\in$E'(S) iff (y, x)$\in$E'(inv(S)). It follows that, (x, y)$\in$E(S) iff. ((y, x)$\in$E'(inv(S)) or (y, x)=(I(b), I(a))). By definition of E, E(inv(S))=E'(inv(S))$\cup\{(I(b), I(a))\}$, therefore, (x, y)$\in$E(S) iff (y, x)$\in$E(inv(S)), which proves (P7)

Otherwise (i.e the considered role S is such that S=inv(P) where P is either R or a super-role of R): by the definition of E, (x, y)∈E(S) iff. (x,y)∈E'(S) or (x,y)=(I(b), I(a)). Since T' is a tableau, (x,y)∈E'(S) iff (y, x)∈E'(inv(S)). So (x, y)∈E(S) iff. ((y, x)∈E'(inv(S)) or (y, x)=(I(a), I(b))). By definition of E, E(P)=E'(P)∪{(I(a), I(b))}(where P=inv(S)), therefore, (x.y)∈E(S) iff (y, x)∈E(inv(S)), which establishes (P7)

(P8) (if(s,t)∈E(Q) and Q⊑S, then (s, t)∈E(S))

Note that a direct consequence of the definition of E is that, for a role P, E'(P) ⊂ E(P)

Case 1: if Q is not R, inv(R), a super-role of R or the inverse of a super-role of R, then, since E(Q)=E'(Q) and T' is a tableau of A'. It follows that: (s,t) ∈E(Q) and Q⊑S=>(s, t)∈E'(S). (P8) holds because E'(S)⊆ E(S).

Case 2: R⊑Q. Let us assume that (s,t)∈E(Q) and Q⊑S. By definition of E, E(Q)=E'(Q)∪{(I(a), I(b))}.

If(s,t)∈E'(Q), since T' is a tableau, (s,t)∈E'(S) ⊆ E(S). So (s,t)∈E(S);

otherwise, (s,t) must be (I(a), I(b)). Since R⊑Q and Q⊑S, we have R⊑S. By definition of E, (I(a), I(b)) ∈E(S)

Otherwise (i.e. Q=inv(P) with R⊑P). Let us assume that (s,t)∈E(Q) and Q ⊑S. By definition of E, E(Q)= E'(Q)∪{(I(b), I(a))}.

If(s,t)∈E'(Q), since T' is a tableau, (s,t)∈E'(S) ⊆ E(S). So (s,t)∈E(S);

otherwise, (s,t) must be (I(b), I(a)). Since (Q⊑S implies P⊑inv(S)) and (R⊑P), we have R⊑inv(S). Therefore by definition of E, (I(a), I(b))∈E(inv(S)). Then from (P7), it follows that (I(b), I(a))∈E(S)

(P11) Not applicable in case of SHIN Abox (P12): (if c: C∈A, then C∈L(I(c)))

By construction of A', C: C∈A implies that c: C∈A'. Therefore, (P12) holds because that L=L', I=I' (3) and T' is a tableau (P13) and (P21) follows from the definition of E and the fact that T' is a tableau (P14) follow from the fact that (1) no distinct assertions (e.g. a≠b) have been removed from or added to from the original Abox A (2) I=I' and (3) T' is a tableau.

(P19) if domain of S is defined and (s, t)∈E(S), then domain (S)∈L(s)

Case 1: if S is not R, inv(R), a super-role of R or the inverse of a super-role of R, then, (P19) follows from E(S)=E'(S), L=L', S=S' and T' is a tableau of A', Case 2: R⊑S. Let us assume that the domain of S is defined and (s, t)∈E(S)

if(s, t)≠(I(a),I(b)), then, by definition of E, (s,t)∈E'(S). Since T' is a tableau for A' and L=L', domain(S)∈L(s);

otherwise (i.e (s, t)=(I(a),I(b))), since R⊑S and the domain of S is defined, by construction of A', a: domain(S) is in A'. Since T' is a tableau for A', (P12) implies that domain(S)∈L'(I'(a)). domain(S)∈L(I (a)) follows from L'=L and I'=I, Otherwise (i.e S=inv(P) and R⊑P).

Let us assume that the domain of S is defined and (s, t)∈E(S), if(s, t)≠(I(b),I(a)), by definition of E, (s,t)∈E'(S) since T' is a tableau for A' and L=L', domain(S)∈L(s);

Otherwise (i.e. (s, t) (I(b), I(a))), since inv(R)⊑S and the domain of S is defined, by construction of A', b: domain(S) is in A'. Since T' is a tableau for A', (P12) implies that domain(S)∈ L'(I'(b)). domain(S)∈L(I (b)) follows from L'=L and I'=I.

(P20) similar to the proof of (P19).

B) Let assume that the original ABox A is consistent. So there exists a tableau T of A.

We prove that T is also a tableau for A'. The only constraints added to A' are of the following forms:

form 1: a: D where D is the domain of a role S such that R⊑S.

form 2: b: B where B is the range of a role S such that R⊑S form 3: b: D where D is the domain of a role S such that inv(R)⊑S form 4: a: B where B is the range of a role S is B and inv(R)⊑S We need to show that with these additional constraints (P12) still holds.

Form 1: Since T is a tableau for A and R(a, b) is in A, by (P13), we have (I(a), I(b)) ∈E(R). Since T is a tableau for A and (I(a), I(b))∈E(R) and R⊑S, (I(a), I(b))∈E(S). Finally, (P19) applied to T as a tableau for A implies D=domain(S)∈L(I(a)).

Form 3: Since T is a tableau for A and R(a, b) is in A, by (P13) and (P7), we have (I(a), I(b))∈E(R) and (I(b), I(a))∈E(inv(R)). (P8) applied to T as a tableau for A implies (I(b), I(a))∈E(S). Finally, (P19) applied to T as a tableau for A yields D=domain(S)∈L(I(b)).

Form 2 and form 4 are proved in a similar fashion.

Lemma B: A role R whose inverse and itself are not involved in any universal restrictions and in any maximum cardinality restrictions is irrelevant (Note: cardinality restriction is translated into a maximum and minimum cardinality restriction with the same value constraint). All edges labeled R in the ABox can safely be removed.

The precise definition of a role not involved in any universal restrictions and in any maximum cardinality restrictions w.r.t. an Abox A is as follows Definition: A role R not involved in any universal restrictions and in any maximum cardinality restrictions w.r.t. an Abox A, a TBox T and a role hierarchy RH iff there is no ∀S. C or ≦n S in clos(A) such that R⊑S.

Proof:

The proof is similar to the proof of lemma A.

A) If the modified ABox A' is consistent, then there is a tableau T'=(S', L', E', I') for A'.

Let T=(S, L, E, I) such that S=S', L'=L, I'=I and E' is such that 1. if R⊑P then E(P)=E'(P)∪{(I(a), I(b))}
2. if R⊑P then E(inv(P))=E'(inv(P))∪{(I(b), I(a))}
3. otherwise, E(P)=E'(P).

We show that T is a tableau of the original Abox A (and therefore that A is consistent) by proving that T satisfies all the 20 constraints on a tableau defined in [SHIQAbox].

(P5) if ∃P.C∈L(s) then, since L'=L and T' is a tableau, there is some t'∈S'(=S) such that (s, t')∈E'(P) and C∈L'(t'). It is obvious from the definition of E that, for a role P, E'(P) ⊂ E(P). Therefore, if ∃P.C∈L(s), then there is some t∈S (t=t') such that (s, t)∈E(P). Furthermore, C∈L(t) (because L=L'), which establishes (P5)

(P10) if ≧n P∈L(s) then, since L'=L and T' is a tableau, card({t∈S'|(s, t) ∈E'(P)})≧n. Since E'(P) ⊂ E(P), it follows that: ≧n P∈L(s) implies card({t∈S|(s, t)∈E(P)})≧n, which establishes (P10)

All the other properties are established as in the proof of lemma A

B) Let assume that the original ABox A is consistent, the proof of the consistency of A' is similar to the proof for Lemma A Lemma D: Let R be a role involved in only n universal restrictions ∀R$_1$.A$_1$, . . . , ∀R$_n$.A$_n$ and whose inverse inv(R) is involved in only m universal restrictions ∀R'$_1$.B$_1$, . . . , $\forall R'_m.B_m$. Furthermore, both R and inv(R) are not involved in any maximum cardinality restrictions. In the ABox, an edge labeled R whose target node is explicitly asserted to be an instance of concepts $C_1, \ldots, C_p$ and whose source node is explicitly asserted to be an instance of concepts $D_1, \ldots, D_q$ can safely be removed if the following conditions hold:

For all $r \in \{1, \ldots, n\}$, there is $k \in \{1, \ldots, p\}$ such that $C_k$ is obviously subsumed by $A_r$.

For all S such that $R \sqsubseteq S$, S is not a transitive role

For all $r \in \{1, \ldots, m\}$ there is $k \in \{1, \ldots, q\}$ such that $D_k$ is obviously subsumed by $B_r$.

For all S such that $inv(R) \sqsubseteq S$, S is not a transitive role

Definition: A role R is involved in universal cardinality restriction $\forall S.C$ w.r.t. an Abox A, a TBox T and a role hierarchy RH iff $\forall S.C \in clos(A)$ and $R \sqsubseteq S$ Definition: A is obviously subsumed by B iff one of the following conditions holds:
a) The TBox contains one of the following axioms $A \sqsubseteq B$ or $A \sqsubseteq B \sqcap C$ or $A \equiv B \sqcap C$
b) There is C such that A is obviously subsumed by C and C is obviously subsumed by B Proof:

A) If A' is consistent w.r.t. T and RH, then is a tableau T'=(S', L', E', I') for A'.

Let T=(S, L, E, I) be such that S=S', L'=L, I'=I and E' is such that for a role P:

4. if $R \sqsubseteq P$ then $E(P)=E'(P) \cup \{(I(a), I(b))\}$
5. if $R \sqsubseteq P$ then $E(inv(P))=E'(inv(P)) \cup \{(I(b), I(a))\}$
6. otherwise $E(P)=E'(P)$.

We show that T is a tableau for A (and therefore that A is consistent) by proving that T satisfies all the 20 constraints on a tableau.

(P4): $\forall P. C \in L(s)$ and $(s, t) \in E(P)$, then $C \in L(t)$

For $s \in S$, let assume that $\forall P. C \in L(s)$ and $(s, t) \in E(P)$,

Case 1: if P is not R, inv(R), a super-role of R or the inverse of a super-role of R, then, (P4) follows from L=L', S=S', E(P)=E'(P) and T' is a tableau for A'

Case 2: $R \sqsubseteq P$.
If $(s, t) \neq (I(a), I(b))$, then, by the definition of E, $(s,t) \in E'(P)$. (P4) holds because L=L', S=S' and T' is a tableau for A'

If $(s, t)=(I(a), I(b))$, since the only universal restrictions in which R is involved are $\forall R_1.A_1, \ldots, \forall R_n.A_n$, there is $i \in \{1, \ldots, n\}$ such that $P=R_i$, and $C=A_i$. Because of the condition imposed by lemma D, there is F such that b: F is in A and F is obviously subsumed by C. By construction of A', b: F is also in A'. Since T' is a tableau for A', $F \in E'(I(b))$. It can easily be proved by induction on the depth of the inference tree of the inductive definition of "obviously subsumed" concepts that $C \in E'(I(b))$. Therefore, by definition of B, $C \in E(I(b))$, which establishes (P4)

Otherwise (i.e P=inv(Q) and $R \sqsubseteq Q$ which means $inv(R) \sqsubseteq P$),
If $(s, t) \neq (I(b), I(a))$, then, by the definition of E, $(s,t) \in E'(P)$. (P4) holds because L=L', S=S' and T' is a tableau for A'

If $(s, t)=(I(b), I(a))$, since the only universal restrictions in which inv(R) is involved are $\forall R'_1.B_1, \ldots, \forall R'_m.B_m$, there is $i \in \{1, \ldots, m\}$ such that $P=R'_i$ and $C=B_i$. Because of the condition imposed by lemma D, there is G such that a: G is in A and G is obviously subsumed by C. By construction of A', a: G is also in A'. Since T' is a tableau for A', $G \in E'(I(a))$. As for case 2, this implies that $C \in E'(I(a))$ ($\sqsubseteq E(I(a))$), which establishes (P4)

(P5): $\forall P. C \in L(s)$ and $(s, t) \in E(Q)$ and $Q \sqsubseteq P$ and Q is transitive, then $\forall Q.C \in L(t)$ For $s \in S$, let assume that $\forall P. C \in L(s)$ and $(s, t) \in E(Q)$ and $Q \sqsubseteq P$ and Q is transitive, Case 1:: if Q is not R, inv(R), a super-role of R or the inverse of a super-role of R, then, (P5) follows from L=L', S=S', E(Q)=E'(Q) and T' is a tableau for A'

Case 2: $R \sqsubseteq Q$
Lemma D imposes that there is no role X such that $R \sqsubseteq X$ and X is transitive. So this case is not possible Otherwise (i.e Q=inv(T) and $R \sqsubseteq T$ which means $inv(R) \sqsubseteq Q$), once again because of the condition imposed by Lemma D, this case is not possible.

Thus the only possible case is case 1, and (P5) has been established for this case.

The proofs of all the other properties are established in a similar way as in Lemma B.

B) Let assume that the original ABox A is consistent, the proof of the consistency of A' is similar to the proof for Lemma A.

Proof of the Pruning of Maximum Cardinality Restrictions

Since the tableau algorithm is a non-deterministic algorithm, for a given step k of the algorithm, they may be more than one branch being explored.

Notation: For a given branch b of the non-deterministic tableau algorithm, $PGP_k^b(i)$ (Pseudo-Generator-Processed) is a subset of concepts in $L_k^b(i)$ of the form $\geq n\ R$ or $\exists R.C$ for which the corresponding pseudo generator rules ($\geq$ or $\exists$) have already been applied. The tableaux algorithm is slightly modified so that this number is properly updated:

a. Each time that the $\geq$-rule is applied to because of the presence of $\geq n\ R$ in $L_k^b(i)$, $PGP_{k+1}^b(i) \to PGP_k^b(i) \cup \{n \geq R\}$ b. Each time that the $\exists$-rule is applied to because of the presence of $\exists R.C$ in $L_k^b(i)$, $PGP_{k+1}^b(i) \to PGP_k^b(i) \cup \{\exists R.C\}$ c. Each time that two real individuals i and ii are merged into the individual i, ), $PGP_{k+1}^b(i) \to PGP_k^b(i) \cup PGP_k^b(ii)$ For a pseudo-individual x, $parent^b(x)$ corresponds to its parent in the completion tree.

For a pseudo individual x created at step k, $RoleGen^b(x) = PGP_k^b(parent^b(x)) - PGP_{k-1}^b(parent(x))$. $RoleGen^b(x)$ corresponds to the element of $PGP_k^b(parent^b(x))$ which leads to the creation of x through the application of the $\exists$-rule or the $\geq$-rule.

We also define the function $Role^b$ which maps a pseudo-individual x to a role R such that $Role^b(x)=R$ iff($RoleGen^b(x)=\exists R.C$ or $RoleGen^b(x)=\geq n\ R$) for some concept C and integer n.

Lemma E1.

Let A be an ABox, and let A' be the ABox obtained after applying the rules Π-rule, RA, RB, RC and RD (defined in section Preliminary) on the A until no rules can be applied.
a. A is consistent iff. A' is consistent
b. For each individual i in A', if $C \in L(i)$ and C is obviously subsumed by D then $D \in L(i)$.

Proof: Straightforward a.1: if A is consistent, there is a tableau T for A. It can easily be proved that T is also a tableau for A': the constraints of type (P12) introduced by the new concept assertions in A' are satisfied because as a tableau for A T satisfies (P1), (P2), (P15), (P16), (P17) and (P18)

a.2: if A' is consistent, then the tableau algorithm performed on A' will produce a clash free completion forest. This is the same completion forest that will be produced by a tableau algorithm that start by applying all Π-rule, RA, RB, RC and RD on the A until no rules can be applied, and then proceed with the same rule application as for A'.

b. is proved by an induction on the depth of the inference tree of the inductive definition of "obviously subsumed by"

In the remainder, we only consider, without lost of generality (thanks to lemma E1), only ABoxes such that for each individual i, if $C \in L_0(i)$ and C is obviously subsumed by D then $D \in L_0(i)$.

Lemma E2. The following hold:
a. Q∈strict-d-attract(P) iff P∈strict-d-attract(Q)
b. Q∈loose-d-attract(P) iff P∈loose-d-attract(Q)
c. Q∈loose-d-attract(P) iff inv(Q)∈loose-d-attract(P)
d. inv(loose-d-attract(P))=loose-d-attract(P)
e. Q∈loose-attract(P) iff P∈loose-attract(Q)
f. Q∈loose-attract(P) iff inv(Q)∈loose-attract(P)
g. inv(loose-attract(P))=loose-attract(P)
h. if Q∈loose-attract(P) then loose-attract(P)=loose-attract(Q)
i. if loose-attract(P)≠∅, then P∈loose-attract(P)

Proof: Obvious consequences of the definitions of loose-d-attract, loose-attract, strict-d-attract Lemma E3.

For a branch b of the non-deterministic tableau algorithm, for a pseudo-individual y in that branch, at a step k before any mergers between neighbors of real-individuals, the following holds:
a. if loose-attract($Role^b(y)$)≠∅, then $L_k^b(parent^b(y), y) \subset$ looseattract($Role^b(y)$)
b. if $parent^b(y)$ is a real individual and strictdattract(inv($Role^b(y)$))=∅, then $L_k^b(parent^b(y), y) = \{Role^b(y)\}$
c. if loose-attract($Role^b(y)$)=∅, then $L_k^b(parent^b(y), y) \subset Role^b(y)\}$ Proof by induction on k. For k=0, trivially satisfied because there are no pseudo-individual.

Let us assume that it is true at step k, we prove it at step k+1 by considering rules that modify edge labels.

∃-rule applied because $\exists S.C \in L_k^b(parent^b(y))$: $L_{k+1}^b(parent^b(y), y) = \{S\} = \{Role^b(y)\}$. If loose-attract($Role^b(y)$)≠∅, lemma E2(i) implies that $Role^b(y) \in$ loose-attract($Role^b(y)$), which establishes (a). (b) and (c) are straightforward.

≧-rule similar to ∃-rule

≤r-rule cannot be applied because we assume that no mergers between neighbors of real individuals can occur ≤-rule applied because ≤n $S \in L_k^b(parent^b(y))$:

Let x be the individual whose two S-neighbors z and y are to be merged (y is neither a real individual nor an ancestor of z). x cannot be a real-individual because we have ruled out mergers of neighbors of real individuals.

Case 1: if z is an ancestor of x, z=$parent^b(x)$ and $L_{k+1}^b(z, x) = L_k^b(z, x) \cup inv(L_k^b(x, y))$ and $L_{k+1}^b(x, y) = \emptyset$.

Since a merger occurs, there must be $Q \in L_k^b(z, x)$ and $P \in L_k^b(x, y)$ such that inv(Q)⊆S and P⊆S which means that P∈loose-attract(Q). So by lemma E2(h), loose-attract(P)=loose-attract(Q)=∅.

Case a: loose-attract($Role^b(y)$)≠∅ and loose-attract($Role^b(x)$)≠∅. Then, by induction hypothesis (a), $L_k^b(z, x) \subset$ looseattract($Role^b(x)$) and $L_k^b(x, y) \subset$ loose-attract($Role^b(y)$). It follows from (Q∈looseattract($Role^b(x)$)) and P∈loose-attract($Role^b(y)$)) and loose-attract(P)=loose-attract(Q) and by lemma E2(h) that loose-attract($Role^b(x)$)) =looseattract($Role^b(y)$)

Case b: loose-attract($Role^b(y)$)=∅. By induction hypothesis (c), $L_k^b(x, y) \subseteq \{Role^b(y)\}$. So P=$Role^b(y)$, but loose-attract(P)≠∅ contradicts the hypothesis loose-attract($Role^b(y)$)=∅. So case b is not possible Otherwise (i.e. loose-attract($Role^b(x)$)=∅). By induction hypothesis (c), $L_k^b(z, x) = \{Role^b(x)\}$. So $Q \subset Role^b(x)$, but loose-attract(Q)≠∅ contradicts the hypothesis loose-attract($Role^b(x)$)=∅. So this case is not possible.

From the previous point, it follows that loose-attract($Role^b(x)$)=loose-attract($Role^b(y)$)≠∅.

Because of the induction hypothesis (a), the fact that loose-attract($Role^b(x)$)=loose-attract($Role^b(y)$)≠∅ and inv(loose-attract($Role^b(y)$))=loose-attract($Role^b(y)$) (lemma E2(d)), (a) holds at step k+1. (c) is trivially satisfied at step k+1 (because $L_{k+1}^b(parent^b(y), y) = \emptyset$ and loose-attract($Role^b(y)$)≠∅)

If z is a real individual and strict-d-attract(inv($Role^b(x)$))=∅, by induction hypothesis (b), $L_k^b(z, x) = \{Role^b(x)\}$. Since z is an ancestor of x and a S-neighbor of x, it follows that inv($Role^b(x)$)⊆S. So inv($Role^b(x)$) ∈strict-d-attract(inv($Role^b(x)$)), which contradicts the assumption that strict-d-attract(inv($Role^b(x)$))=∅. (b) is trivially.

Otherwise (i.e. z is not an ancestor of x). $L_{k+1}^b(x, z) = L_k^b(x, z) \cup L_k^b(x, y)$ and $L_{k+1}^b(x,y)=\emptyset$.

We can establish that loose-attract($Role^b(z)$)=loose-attract($Role^b(y)$)≠∅ as we did establish loose-attract($Role^b(x)$)=loose-attract($Role^b(y)$)≠∅ in case 1.

Because of the induction hypothesis (a) and loose-attract($Role^b(z)$)=loose-attract($Role^b(y)$)≠∅., (a) obviously holds at step k+1. (c) is trivially satisfied at step k+1 (because $L_{k+1}^b(parent^b(y), y) = \emptyset$ and loose-attract($Role^b(y)$)≠∅)

(b) is trivially satisfied because x cannot be a real individual (because we have ruled out mergers of neighbors of real individuals.)

Lemma E4: For a real individual i of an ABox A (i.e. an individual present in A before the application of any tableau rule), at step k of the tableau algorithm before the first merger of neighbors of a real individual, the set $Neighbor_k^b(i, R)$ of R-neighbors of i for a branch b of the non-detenninistic tableau algorithm is such that:

card($Neighbor_k^b(i, R)$)≦card($Neighbor_0^b(i, R)$)+card({∃P.A|∃P.A∈$PGP_k^b(i)$ and P⊆R and there is no ii∈$Neighbor_0(i, P)$ s.t. $B \in L_0(ii)$ and B is obviously subsumed by A})+Sum((m|≧m P∈$PGP_k^b(i)$ and P⊆R))+card({∃T.A|∃T.A∈$PGP_k^b(i)$ and not(T⊆R) and strict-d-attract(inv(T))≠{} and S∈loose-attract(T) and S⊆R and there is no ii∈$Neighbor_0(i, T)$ s.t. $B \in L_0(ii)$ and B is obviously subsumed by A}+Sum(m≠≧m T∈$PGP_k^b(i)$ and not(T⊆R) and strict-d-attract(inv(T))≠{} and S∈loose-attract(T) and S⊆R)

Proof:

First note that since we are considering, without lost of generality (thanks to lemma E1), only ABoxes such that each individual i, if $C \in L_0(i)$ and C is obviously subsumed by D then $D \in L_0(i)$ and C is obviously subsumed by C, it follows that:

{∃P.A∈$PGP_k$|P⊆R and there is no ii∈$Neighbor_0(i, P)$ s.t. $B \in L_0(ii)$ and B is obviously subsumed by A}={∃P.A∈$PGP_k$| P⊆R and there is no ii∈$Neighbor_0(i, P)$ s.t. $A \in L_0(ii)$}

We need to prove:
card($Neighbor_k^b(i, R)$)≦card($Neighbor_0^b(i, R)$)
+card({∃T.A|∃T.A∈$PGP_k^b(i)$ and T⊆R and there is no ii∈$Neighbor_0(i, T)$ s.t. $A \in L_0(ii)$})
+Sum(m|≧m P∈$PGP_k^b(i)$ and P⊆R)

+card({∃T.A|∃T.A∈PGP$_k^b$(i) and not(T⊑R) and strict-d-attract(inv(T))≠{}and S∈loose-attract(T) and S⊑R and there is no ii∈Neighbor$_0$(i, T) s.t. A∈L$_0$(ii)}
+Sum(m|≧m T∈PGP$_k^b$(i) and not(T⊑R) and strict-d-attract(inv(T))≠{}and S∈loose-attract(T) and S⊑R)

Neighbor$_k^b$(i, R) can be partitioned in 7 disjoint sets:
N1={y|y∈Neighbor$_k^b$(i, R) and y is real individual and }
N2={y|y∈Neighbor$_k^b$(i) and y is pseudo individual and RoleGen(y)=∃T.A and T ⊑R and there is no ii∈Neighbor$_0$(i, S) s.t. A∈L$_0$(ii)}
N3={y|y∈Neighbor$_k^b$(i) and y is pseudo individual and RoleGen(y)=≧m T and T⊑R}
N4={y|y∈Neighbor$_k^b$(i) andy is pseudo individual and RoleGen(y)=∃T.A and not(T⊑R) and S∈L$_k^b$(i, y) and S⊑R and there is no ii∈Neighbor$_0$(i, T) s.t. A∈L$_0$(ii)}
N5={y|y∈Neighbor$_k^b$(i) and y is pseudo individual and RoleGen(y)=≧m T and not(T⊑R) and S∈L$_k^b$(i, y) and S⊑R }
N6={y|y∈Neighbor$_k^b$(i) and y is pseudo individual and RoleGen(y)=∃T.A and T ⊑R and there is ii∈Neighbor$_0$ (i, S) s.t. A∈L$_0$(ii)}
N7={y|y∈Neighbor$_k^b$(i) and y is pseudo individual and RoleGen(y)=∃T.A and not(T⊑R) and S∈L$_k^b$(i, y) and S⊑R and there is ii∈Neighbor$_0$(i, T) s.t. A∈L$_0$(ii)}

N6 and N7 are obviously empty because, since there is ii∈Neighbor$_0$(i, T) s.t. A∈L$_0$(ii), the ∃-rule will never create new pseudo individual y such that RoleGen(y)=∃T.A if ∃T.A∈L$_k^b$(i).

Since we assume that no mergers between real individual has occurred, (I) N1=Neighbor$_0$(i, R)

It can easily be proved that RoleGen function restricted to N2 is an injection from N2 to {∃S.C|∃S.C∈PGP$_k^b$(i) and S⊑R and there is no ii∈Neighbor$_0$(i, S) s.t. A∈L$_0$(ii)}and all elements of N2are mapped. Therefore, (II) card(N2)≦card({∃T.C|∃T.C PGP$_k^b$(i) and T⊑R and there is no ii∈Neighbor$_0$(i, T) s.t. A∈L$_0$(ii)}).

N4 can be partitioned into two disjoint sets:
M1={y|y Neighbor$_k^b$(i) and y is pseudo individual and RoleGen(y)=∃T.A and not(T⊑R) and S∈L$_k^b$(i, y) and S⊑R and there is no ii∈Neighbor$_0$(i, T) s.t. A∈L$_0$(ii) and strict-d-attract(inv(T))≠∅}
M2={y|y∈Neighbor$_k^b$(i) and y is pseudo individual and RoleGen(y)=∃T.A and not(T⊑R) and S∈L$_k^b$(i, y) and S⊑R and there is no ii∈Neighbor$_0$(i, T) s.t. A∈L$_0$(ii) and strict-d-attract(inv(T))=∅}

Let y be such that y∈M2 and RoleGen(y)=∃T.A, Lemma E3 (b) implies that that L k$^b$(i, y)={T }. It follows that T⊑R and not(T⊑R). Therefore M2=∅. So N4=M1

M1 ⊂ {y|y∈Neighbor$_k^b$(i) and y is pseudo individual and RoleGen(y)=∃T.A and not(T⊑R) and S∈loose-attract(T) and S⊑R and there is no ii∈Neighbor$_0$(i, T) s.t. A∈L$_0$(ii) and strict-d-attract(inv(T))≠∅}(=def=X) is a direct consequence of the fact that (strict-d-attract(inv(T))≠∅ implies∈loose-attract(T)≠∅) and lemma E3(a).

It can easily be showed that the RoleGen function restricted to X is an injection from X to {∃T.A|∃T.A∈PGP$_k^b$(i) and not(T⊑R) and strict-d-attract(inv(T))≠∅ and S∈loose-attract (T) and S⊑R and there is no ii∈Neighbor$_0$(i, T) s.t. A∈L$_0$(ii)}and all elements of X are mapped. Therefore card(X)≦card({∃T.A|∃T.A∈PGP$_k^b$(i) and not(T⊑R) and strict-d-attract(inv(T)) ≠∅ and S∈loose-attract(T) and S⊑R and there is no ii∈Neighbor$_0$(i, T) s.t. A∈L$_0$(ii)}). Since N4 ⊂X, we have (III) card(N4)≦card({∃T.A|∃T.A∈PGP$_k^b$(i) and not(T⊑R) and strict-d-attract(inv(T))≠∅ and S∈loose-attract(T) and S⊑R and there is no ii∈Neighbor$_0$(i, T) s.t. A∈L$_0$(ii)}).

Let Y be such that Y=RoleGen({y∈Neighbor$_k^b$(i) and y is pseudo individual})

Let f be the function defined from N3 to {≧mP|≧mP∈Y and P⊑R}=Z as follows: f(y)=RoleGen(y). It can easily be proved that f is a surjection and for card({y|f(y)∈Z})=m and for all y in N3 f(y) is defined. It follows that card(N3)=Sum (m|≧mP∈Y and P⊑R). Since Y ⊂ PGP$_k^b$(i), we have (IV) card(N3) Sum(m|≧mP∈$\overline{PGP}_k^b$(i) and P⊑R)

We prove the following in a similar way as (IV) and by using Lemma E3 as we did in establishing (III):

(V) card(N5)≦Sum(m|≧m T∈PGP$_k^b$(i) and not(T⊑R) and strict-d-attract(inv(T))≠{} and S∈loose-attract(T) and S⊑R)

Lemma E4 follows from (I), (II), (III), (IV), (V) and the fact that Neighbor$_k^b$(i, R) can be partitioned by the disjoint sets N1, N2, N3, N4 and N5

Lemma E:

For a real individual i of an ABox A (i.e. an individual present in A before the application of any tableau rule), at step k of the tableau algorithm before the first merger of neighbors of a real individual, the set R) of R-neighbors of i for a clash-free branch b of the non-deterministic tableau algorithm is such that:

if≦n R∈L$_k$(i), then card(Neighbor$_k^b$(i, R)) card(Neighbor$_0$ (i, R))+card({∃P.A∈clos(A)|P⊑R and there is no ii∈Neighbor$_0$(i, P) s.t. B∈L$_0$(ii) and B is obviously subsumed by A})+Sum((m|≦mP∈clos(A) and P⊑R and n≧m))+card({∃T.A|∃T.A∈clos(A) and not(T⊑R) and strict-d-attract(inv(T))≠{}and S∈loose-attract(T) and S⊑R and there is no ii∈Neighbor$_0$(i, T) s.t. B∈L$_0$(ii) and B is obviously subsumed by A}+Sum(m|≧m T∈clos(A) and not(T⊑R) and strict-d-attract(inv(T))≠{} and S∈loose-attract(T) and S⊑R)

Proof:

If the branch b is clash-free and ≦n R∈L$_k$(i), then PGP$_k^b$(i) cannot contain a concept ≧mP such that n<m and P⊑R because {≧mP, ≧n R}constitutes a clash. Therefore {≧mP|≧mP∈PGP$_k^b$(i)andP⊑R}={≧mP|≧mP∈PGP$_k^b$(i) and P⊑R and n≧m}.

It follows that Sum(m|≧mP∈PGP$_k^b$(i) and P R)=Sum (m|≧mP∈PGP$_k^b$(i) and P ⊑R and n≧m). Now Lemma E is a direct consequence of Lemma E4 and the obvious fact that PGP$_k^b$(i)⊂clos(A)

Lemma F:

For an ABox A, if for all ≦nR∈clos(A), for real individual i in A, the following condition holds:

card(Neighbor$_0$(i, R))+card({∃P.A∈clos(A)|P⊑R and there is no ii∈Neighbor$_0$(i, P) s.t. B∈L$_0$(ii) and B is obviously subsumed by A})+Sum((m|mP∈clos(A) and P⊑R and n≧m))+card({∃T.A|∃T.A∈clos(A) and not(T⊑R) and strict-d-attract(inv(T))≠{} and S∈loose-attract(T) and S⊑R and there is no ii∈Neighbor$_0$(i, T) s.t. B∈L$_0$(ii) and B is obviously subsumed by A}+Sum(m|≧m T∈clos (A) and not(T ⊑R) and strict-d-attract(inv(T))≠{} and S∈loose-attract(T) and S⊑R)≦n then, during the tableau algorithm, no mergers between neighbors of real individuals can occur.

Proof: Proof by contradiction.

Let assume that the condition of lemma F holds and the first merger between neighbors of real individuals occurs at step k0 (k0 must be greater than 0). Let b be a branch where the first such merger occurs at step k0.

Case 1: at the end of step k0-1 the branch b has a clash. By the specification of the tableau algorithm no more rules are triggered for that branch in step k such that k>k0-1. Therefore no mergers will occur at step k0, which contradicts the hypothesis Otherwise (i.e. at the end of step k0-1 the branch b is clash-free). There must be a real individual i such that $\leq n$ $R \in L_{k0-1}(i)$ and card (Neighbor$_{k0-1}^b$(i, R))>n. But lemma E and the condition imposed by lemma F imply that card (Neighbor$_{k0-1}^b$(i, R))$\leq$n. Contradiction.

Theorem:

For an ABox A, if for all $\leq$nR $\in$clos(A), for real individual i in A, the following condition holds:

card(Neighbor$_0$(i, R))+card(({$\exists$P.A $\in$clos(A)|P $\sqsubseteq$R and there is no ii $\in$Neighbor$_0$(i, P) s.t. B$\in L_0$(ii) and B is obviously subsumed by A})+Sum((m|$\geq$mP $\in$clos(A) and P $\sqsubseteq$R and n$\geq$m))+card({$\exists$T.A|$\exists$T.A $\in$clos(A) and not(T$\sqsubseteq$R) and strict-d-attract(inv(T))$\neq${} and S $\in$loose-attract(T) and S$\sqsubseteq$R and there is no ii$\in$Neighbor$_0$(i, T) s.t. B$\in L_0$(ii) and B is obviously subsumed by A}+Sum (m|$\geq$m T $\in$clos(A) and not(T $\sqsubseteq$R) and strict-d-attract (inv(T))$\neq${} and S $\in$loose-attract(T) and S$\sqsubseteq$R))$\leq$n then all edges of A label with a role not involved in any universal cardinality restrictions and whose inverse is not involved in any universal cardinality restrictions can be safely removed from A Proof:

For simplicity of the presentation, we do not consider domain and range constraints. Let A' be the Abox obtained from A after the pruning allowed by the theorem. We need to show that A' is consistent if A is consistent.

A) Assuming that A' is consistent. The tableau algorithm will produce a clash-free completion forest CF'. Now if we add to CF' all the edges that were removed from A, this can only create new neighbors of real individuals (neighbors of pseudo individuals remain the same). Let CF be the new completion forest obtained from CF' by this addiction of edges. A straightforward case by case analysis shows that no tableau rule can be applied to CF. The key here is that lemma F and the condition of the theorem guarantee that no mergers between neighbors of real individuals can occur. CF is also obviously clash-free.

A is consistent because the tableau algorithm on it produces a clash-free completion forest CF.

B) If A is consistent as for pruning lemmas, it is obvious that A' is consistent (we have less constraints to satisfy)

Proof of Consistency Check on Summary Graphs

Theorem 1: Let G:=(V, Ed, $2^{clos(A)}$, Roles, v1) be the canonical generalized SHIN-ABox graph of a SI-fiN Abox A, and let f be a reduction from G to G':=(V', Ed', $2^{concepts'}$Roles', v1'), then If the ABox A', which corresponds to G' and has all the equalities and inequalities derived from the set of equality and inequality assertions defined in A by f, is consistent then A is consistent Proof:

Let assume that ABox A' corresponding to G' is consistent. Therefore there must exist a tableau T'=(S', L', B', I') for A' such that:

L': S'$\rightarrow 2^{clos(A')}$ maps each element in S' to a set of concepts,

Let T (S, L, B, I) be such that

S=S'

L: S$\rightarrow 2^{clos(A)}$, such that, for s $\in$S, L(s)=L'(s) (note that by definition of A', clos(A')$\subseteq$ concepts'. Since G' is a reduction of G clos(A)=concepts', $2^{clos(A')} \subset 2^{clos(A)}$. Therefore, for an element s of S, L(s) is defined and L(s)$\in 2^{clos(A)}$)

E=E'

I:I$_A \rightarrow$S such that, for a $\in I_A$, I(a)=I'(f(a)). Note that if a $\in I_A$, by definition of G, a $\in$V. So f(a) $\in$V', which, by definition of G' and A', implies that f(a) $\in I_{A'}$. Thus I'(f(a)) is well defined We prove that T is a tableau for A by showing that it satisfies all the 21 properties of a tableau:

(P12) if a: C $\in$A, thenC$\in$L(I(a))

If a: C$\in$A, by the definition of the canonical generalized SHIN-ABox graph G, a $\in$V and C$\in$v1(a). Since f is a reduction from G to G', C $\in$v140 (f(a)). So, by the definition of the Abox A' corresponding to a generalized SHIN-ABox graph G', f(a): C $\in$A'. It follows from the fact that T' is a tableau for A' that C$\in$L'(I'(f (a))). By definition of I and the fact that L(s)=L'(s) for s in S, we have C$\in$L(I(a)), which establishes (P12).

(P13) if R(a, b)$\in$A, then (I(a), I(b))$\in$E(R)

If R(a, b)$\in$A, then, by the definition of the canonical generalized SHIN-ABox graph G, (a, R, b)$\in$Roles. Since f is a reduction from G to G', (f(a), R, f(b)) $\in$Roles'. So, by the definition of the Abox A' corresponding to a generalized SH1N-ABox graph G', R(f (a), f(b))$\in$A'. It follows from the fact that T' is a tableau for A' that (I'(f(a)), I'(f(b)))$\in$E'(R). Since E=E' and I(a)=I'(f(a)) and I(b)=I'(f(b)), (I(a), I(b))$\in$E(R), which establishes (P13)

(P14) if different(a, b)$\in$A, then I(a)$\neq$I(b)

If different(a, b)$\in$A, by the definition of A', different(f(a), f(b))$\in$A'. It follows from the fact that T' is a tableau for A' that I'(f(a)) * I'(f(b)). This implies, by definition of I, I(a)$\neq$I(b), which establishes (P14)

(P21) similar proof as (P14)

All the other properties follow from S=S', E=E' and for all s$\in$S, L(s)=L'(s).

Proof of the Flow Analysis Algorithm

Lemma G: The flow analysis algorithm described in section "Analysis Algorithm" always terminates.

Proof: The proof is similar to the proof of the termination of the tableau algorithm presented in [SHIQAbox]. The few differences are as follows:

The maximum depth of completion trees here is the parameter md to the algorithm

Since concepts are never removed from concept labels, by definition of childMayBeMergedWithNon-eBlockedIndiv(Node s, Role S) and childMayInfluenceAnc(Node s, Role S), once a node has been removed from the blocked set it will never be inserted in it later on.

Definition: A statically complete generalized SHIN-ABox graph G=(V, E, $2^{\hat{}}$Con, Roles, v1, w) w.r.t a TBox T=T$_u \cup$T$_g$ with a maximum depth md and a set blocked of blocked nodes and a depth function depth is a generalized SHIN-ABox such that the following hold: for all s, t$\in$V, C, C1, C2$\in 2^{\hat{}}$Con and R, S$\in$Roles 1) E=E'$\cup$E" (Note E" contains additional edges)
2) If s$\in$blocked and C1$\sqcap$C1$\in$v1(s), then {C1, C2} $\subset$v1(s)
3) if s$\in$blocked and C1$\sqcup$C2$\in$v1(s), then {C1, C2}$\overline{v1}$(s)
4) if s$\in$blocked and $\forall$S.C$\in$v1(s) and t$\in$neighbor(s, S, E) and t$\notin$blocked, then C$\in$v1(t)
5) if s$\notin$blocked and $\forall$S.C$\in$v1(s) and t$\in$neighbor(s, R, E) and R$\sqsubseteq$S and R transitive and t$\notin$blocked, then $\forall$R.C$\in$v1 (t)
6) if
  a. depth(s)<md,
  b. and $\exists$S.C$\in$v1(s)
  c. s$\notin$blocked
  then there is a t$\in$neighbor(s, S. E) such that C$\in$v1(t)
7) if
  a. depth(s)<md,
  b. and $\leq$n S$\in$v1(s)
  c. s$\notin$blocked
  then neighbor(s, S, E)$\neq \emptyset$ 8) if s∉blocked and ≦n S∈v1(s), then card(neighbor(s, S, E))≦1
9) if s∉blocked and C∈v1(s), and there is C⊑D in $T_u$, then D∈v1(s)
10) if s∉blocked and C∈v1(s) and there is C≡D in $T_u$, then D∈v1(s)
11) if s∉blocked and ¬C∈v1(s) and there is C≡D in $T_u$, then ¬D∈v1(s)
12) if s∉blocked and $T_g$ is not empty, then $C_{T_g}$∈v1(s)
13) if
   a. s∉blocked and there is a S-neighbor(E) of s, and
   b. the domain of S is specified, and then domain(S)∈v1(s)
14) if
   a. s∉blocked and there is a S-neighbor(E) of s, and
   b. S is a functional role, and then≦1S∈v1(s)
15) if
   a. s∉blocked and t is a S-neighbor(E) of s, and
   b. t∉blocked, and
   c. the range of S is specified, and then range(S)∈v1(s)
16) if
   a. s∉blocked, and
   b. (depth(s)=md) or (depth(s)=md−1), and then clos(v1(s))⊆v1(s)
17) If
   c. s∉blocked, and
   d. depth(s)=md−1, and
   e. there is x∈neighbor(s, E) and x∉blocked and depth(x)=md, and
   f. there is a role Q such that Q∈gen(v1(x))∪inv(gen(v1(x))) then (s, inv(Q),x)∈E Lemma H: The flow analysis algorithm described in section "Analysis Algorithm" produces a statically complete generalized SHIN-ABox graph (after removing all stopped nodes and their descendants)

Proof: Proof by contradiction

At the end of the algorithm, if one of the properties of the definition of statically complete generalized SHIN-ABox graph is not satisfied, then it is obvious that one of the rules defined in the specification of the algorithm will be applicable. Therefore, the algorithm has not terminated yet, which contradicts the hypothesis.

Lemma I: Throughout the execution of the algorithm, for v∈V0, there is exactly one x in V such that v∈initial(x) and x∉stopped. Furthermore, x∈V0.

Proof: Proof by induction on the number of iterations (or steps).

Initially (for step k=0), by construction of initial, for all v∈V0, initial (v)={v} and V=V0. Therefore the property is satisfied for k=0.

Assuming that the property holds for a step k, we prove it at step k+1.

initial is only modified by the application of the ≦-rule because ≦nS is in v1(s):

Case 1: If the set N=neighbor(s, S, E) has only pseudo-individuals, then, by construction, the chosen element x of N whose initial value is changed is such that $initial_{k+1}(x)$=Union($initial_k(y)|y∈N$). By induction hypothesis, Union($initial_k(y)$ y∈N) and V0 are disjoint. Therefore, at k+1, there is exactly one x in V such that v∈$initial_{k+1}(x)$ and x∈$stopped_{k+1}$ and x∈V0 (x is the same element as at the previous step k).

Otherwise (i.e. there is at least one real individual in the set N=neighbor(s, S, E)), the chosen element x of N whose initial value is modified is such that $initial_{k+1}(x)$=Union($initial_k(y)|y∈N$). All the elements of N−{x} are in stopped at step k+1, but there were not in stopped at step k. For v∈V0, let y be the unique y at step k such that v∈$initial_k(y)$ and y∉$stopped_k$ If y∈N, then by construction v∈$initial_{k+1}(x)$ and, by induction hypothesis and the fact all the elements of N−{x} are in stopped at step k+1 that, if y∈V−{x} such that v∈$initial_{k+1}(y)$, then y∈$stopped_{k+1}$. So x is the unique element of V such that v∈$initial_{k+q}(x)$ and x stopped$_{k+1}$ Otherwise (i.e y∉N), y must be in V0 by induction hypothesis. By induction hypothesis, there are no elements of V0 in both $initial_k$ (y) and Union($initial_k$ (z)|z∈N)=$initial_{k+1}(x)$. Since only the value of $initial_{k+1}(x)$ may be different from its value at the previous step ($initial_k(x)$), it follows that, at step k+1, y is still the unique element of V such that v∈$initial_{k+1}(y)$ and y∉$stopped_{k+1}$ Lemma I ensures that at step k of the flow analysis algorithm we can define the function $h_k$ as follows: $h_k$: V0→V0 such that $h_k(v)$ is the unique element of V0 such that v initial ($h_k(v)$) and $h_k(V)$∉stopped Lemma J: At each step k of the flow analysis, the following hold:
   a. if v∈$V_0$, then $v1_0(v) ⊂ v1_k(h_k(v))$
   b. if v1∈$V_0$, v2∈$V_0$ and $\overline{v1}$ is a R-neighbor v2, then $h_k(v1)$ is a R-neighbor $h_k(v2)$ Proof: Simple proof by induction.

The important facts here are:

Concepts are never removed from concept sets

When real individuals are merged, their incoming and outgoing edges are moved so that they belong to the merged node.

Lemma K:

At a given step k of the tableau algorithm, for a given completion tree CT and for a given sub-tree ST of CT rooted at the individual x (real or pseudo), the following hold:
   a. For an edge e=(s,t) of ST. the set $L_k(s,t)$ of labels e is such that $L_k(s,t) ⊆ \{Q|Q∈gen(clos(L_k(x)))$ or $inv(Q)∈gen(clos(L_k(x)))\}$
   b. For an individual y (or node y) in ST, $L_k(y) ⊆ clos(L_k(x))$ Proof: Easy proof by induction.

Theorem 2:

Let A be SHIN ABox, let GA be its canonical generalized SHIN-ABox graph GA, let G0 be a generalized SHIN-ABox graph G0 and g0 a reduction from GA to G0, let (G, h) such that (G=(V, E=E'∪E", 2^Con, Roles, v1, w), h)=AnalysisAlgorithm(G0), let (A0=A, A1, . . . , An) a sequence of SHIN ABoxes derived from the application of the tableaux expansion rules to A, for all k∈{0, . . . , n}, for all i∈A0: Lk(i) ⊆v1(h(g0(i))), where Lk (i) is the label associated with i in the Abox Ak Proof:

We define a function f which maps nodes of Ak to the statically complete generalized SHIN-ABox graph G (lemma H) produced by the static flow analysis algorithm.
   a. For all individuals i of A0, f(i)=h(g0(i))
   b. if f(x)=s is already defined and s∉blocked and depth(s) <md, and a successor y of x was generated for ∃RC∈$L_r$(x) for r≦k, then f(y)=t for some t∈V such that C∈v1(t) and t is a R-neighbor of s
   c. if f(x)=s is already defined and s∈blocked and depth(s) <md, and a successor y of x was generated for≧n R∈$L_r$(x) for r≦k, then f(y)=t for some t∈V such that t is a R-neighbor of s At step k=0, because of lemma J and the fact that g0 is a reduction, following hold:

1. if x∈Ak and f(x) is defined and f(x)∈blocked, Lk(x) ⊆v1(f(x))

2. if x∈Ak and y∈Ak and f(x) and f(y) are defined and f(x)∉blocked and f(y)∉blocked, then if y is a S-neighbor of x then f(y) is a S-neighbor of f(x)

Assuming that (1) and (2) hold at a step k, we now prove that they also hold at step k+1.

If Π-rule is applied at step k+1 because $C1\sqcap C2 \in Lk(x)$,
if $f(x)$ is defined and $f(x) \notin$ blocked, since $Lk(x) \subset v1(f(x))$, $C1\sqcap C2 \in v1(f(x)))$. $\{C1, C2\} \subseteq v1(f(x))$ because G is statically complete.

⊔-rule: similar to Π-rule

∀-rule: ∀S. C∈Lk(x) and y is a S-neighbor of x such that C∉Lk(y) We assume that f(y) is defined and f(y) ∉blocked.

Case 1: If x is a real individual, f(x) is defined and is not blocked (real individual cannot be blocked during the flow analysis). (1) and (2) at k+1 are obvious consequences of the induction hypothesis and the fact that G is statically complete.

Case 2: If x is pseudo individual parent of y, then since f(y) is defined, f(x) must also be defined and not blocked (this is a direct consequence of (b) and (c) in the definition of f). (1) and (2) at k+1 then follow as obvious consequences of the induction hypothesis and the fact that G is statically complete.

Otherwise (x is a pseudo-individual child of y):

Case a: depth(f(y))<md, since childMayInfluenceAnc(y, S), it is obvious that childMayInfluenceAnc(f(y), S). So, f(y) cannot be blocked. Therefore f(x) must be defined (this is a consequence of (b) and (c) in the definition of f). (1) and (2) at k+1 then follow obvious consequences of the induction hypothesis and the fact that G is statically complete.

Otherwise: (depth(f(y))=md), f(x) is not defined. However, Lemma K ensures that $Lk(x) \subset clos(Lk(y))$. By definition of clos, ∀S. C∈clos$(Lk(y))$ implies C∈clos(Lk(y)). By induction hypothesis, $Lk(y) \subset v1(f(y))$. Therefore, clos(Lk(y))$\subset$clos(v1(f(y))) (direct consequence of the definition of cbs). Since G is statically complete and depth(f(y))=md, then clos(v1(f(y)))$\subseteq$v1(f(y)). So C∈v1(f(y)).

∀+-rule: Similar to ∀-rule

∃-rule: ∃S. C∈Lk(x) and x has no S-neighbor of y such that C∈Lk(y), we create a new node y such that C∈Lk+1(y), Case 1: if f(x) is defined and f(x)∉blocked, Case a: if depth(f(x))<md, by induction hypothesis ∃S. C∈v1(f(x)). Since that G is statically complete, there is some t∈V such that C∈v1(t) and t is a R-neighbor of f(x). So f(y)=t is defined. (1) and (2) follow as direct consequence of the definition of f(y)

Otherwise (i.e. f(x)=md). f(y) cannot be defined. (1) and (2) are trivially satisfied (their if-condition is always false for the newly created node and edge)

Otherwise (if f(x) is not defined or f(x)∈blocked), f(y) cannot be defined. (1) and (2) are trivially satisfied (their if-condition is always false)

≧-rule: similar to ∃-rule.

≧r-rule: Let y, z be the two real individuals to be merged because they are S-neighbors of the real individual x such that ≦n S∈Lk(x). f(x), f(y) and f(z) are obviously defined and they are not blocked. By induction hypothesis, ≦n S∈v1(f(x)). Since G is statically complete, f(x) has at most one S-neighbor. Since f(y) and f(z) are both S-neighbor of f(x) (by induction hypothesis), it follows that f(z)=f(y), which naturally implies that (1) and (2) still hold at step k+1.

≦-rule: Let y and z be the two individuals to be merged because they are S-neighbors of the individual x such that ≦n S∈Lk(x). y is neither and ancestor of z nor a real individual.

Case 1: z is not an ancestor of x:

Case a: z is a real individual. Therefore, x must also be a real individual (because a pseudo individual cannot be an ancestor of a real individual). f(x) and f(z) are obviously defined and not blocked. Since y is a pseudo-individual whose parent is a real individual, depth(y)=1>=md (md is always greater or equal to 1). It follows that f(y) is defined. f(z) is an S-neighbor of f(x) by induction hypothesis. Since childMayBeMergedWithiNoneBlockedIndiv(x, S) (otherwise, a merger would not be possible), Lk(x) $\subset$ v1(f(x)) (by induction hypothesis) and f(z) is an S-neighbor of f(x) (f(x) not blocked), we must have childMayBeMergedWithNoneBlockedIndiv(f(x), S). Therefore, f(y) is not blocked. Thus f(y) is defined in f(y)∉blocked, so, by induction hypothesis, since y is a S-neighbor of x, f(y) is a S-neighbor of f(x). We have already established that f(z) is also a S-neighbor of f(x). Since G is statically complete and ≦n S∈v1(f(x)), f(x) has at most one S-neighbor, which means that f(y)=f(z), which naturally implies that (1) and (2) still hold at step k+1.

Case b: z is a pseudo individual. Assuming f(z) is defined and is not blocked, f(x) must be defined and not blocked (direct consequence of the definition off). Since f(z) is defined, depth(x)<md. So f(y) must also be defined. Since f(z) is not blocked, we must have childMayBeMergedWithNoneBlockedIndiv(f(x), S) or childMayInfluenceAnc(f(x), S), in either case, it implies that f(y) is not blocked. As in case a, we can prove f(z)=f(y), which naturally implies that (1) and (2) still hold at step k+1.

Case 2: z is an ancestor of x:

We assume that f(z) is defined and not blocked

Case a: depth(z)<md−1. f(x) is defined and it can easily be established that childMaylnfluenceAnc(f(z), S) (consequence of childMayInfluenceAnc(z, S)). Therefore f(x) is not blocked. So f(y) is defined. Furthermore, childMayBeMergedWithNoneBlockedIndiv(f(x) S) is a consequence of childMayBeMergedWithNoneBlockedIndiv(x, S) and f(z) is not blocked and f(z) is a S-neighbor of f(x) (by induction hypothesis). So f(y) is not blocked. As in previous cases, we can establish f(y)=f(z).

Case b: depth(z)=md.f(x) and f(y) cannot be defined, but lemma K (b), the induction hypothesis and the fact that G is statically complete ensure that Lk+1(z)$\subset$v1(f(z))

Case c: depth(z)=md−1. f(x) is defined, and it can be proved, as in case a, that f(x) is not blocked. f(y) cannot be defined, but lemma K (a) and (b), the induction hypothesis and the fact that G is statically complete ensure that Lk+1(z)$\subset$v1(f(z)) (from which (1) is proved to still hold at step k+1), and For all R∈Inv(L(x,y)), (f(z), R, f(x))∈E, from which (2) is proved to still hold at step k+1

Rule RA, RB, RC, RD: similar to Π-rule
Rule RE and RF: similar to ∀-rule.

What is claimed is:

1. An apparatus comprising:
   an import module receiving an original ontology and importing said original ontology into a data store that a reasoning engine relies on for data;
   a scope definition module comprising a scope processor enabling a user to specify a sub-part of an ontology;
   a query processing component parsing a query;
   a storage manager enabling create, read, update, delete plus passing through reasoning functions, wherein said storage manager is operatively coupled with the import module, the scope definition module, and the query processing component; and
   a reasoning engine operatively coupled with the storage manager, said reasoning engine:
      generating an abstraction of the original ontology; and
      applying at least one transformation to the abstraction for producing a simplified ontology;
   wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

2. The apparatus of claim 1 wherein the reasoning engine comprises:
   a taxonomy builder inferring implicit subclass and equivalence relationships between concepts;
   a consistency detection component discovering any inconsistencies in the ontology;
   a relationship query component executing queries about relationships between instances; and
   a membership query component executing queries about types of various individuals.

3. The apparatus of claim 2 wherein the reasoning engine applies the at least one transformation by eliminating relationships in the abstraction by inserting new relationships in the abstraction.

4. The apparatus of claim 2 wherein the reasoning engine applies the at least one transformation by eliminating individuals in the abstraction by inserting new individuals in the abstraction.

5. The apparatus of claim 2 wherein the reasoning engine applies the at least one transformation by eliminating concepts in the abstraction by inserting new concepts into the abstraction.

6. The apparatus of claim 2 further comprising the data store operatively coupled with the storage manager and the reasoning engine.

7. The apparatus of claim 6 wherein the data store comprises a resource description framework store.

8. The apparatus of claim 6, wherein the data store is a persistent data store.

9. The apparatus of claim 1 wherein the reasoning engine generates the simplified ontology and compresses the original ontology with the simplified ontology, wherein the simplified ontology tracks changes in the original ontology, such that updates to said original ontology do not require re-generation of the simplified ontology; and
   wherein the reasoning engine reasons over the simplified ontology instead of the original ontology for executing the query.

10. The apparatus of claim 9 wherein the reasoning engine, responsive to receiving a query, determines a response to the query in conjunction with the simplified ontology.

11. The apparatus of claim 10 wherein the reasoning engine generates an explanation of how a specific inference was made.

12. The apparatus of claim 1 wherein the original ontology comprises ontology web language documents and any derivatives thereof which are used to express ontologies.

13. The apparatus of claim 1, wherein the query is expressed in SPARQL, a standardized query language.

14. The computer-implemented method of claim 13 further comprising storing the simplified ontology.

15. The computer-implemented method of claim 13 further comprising generating an interactive visualization of knowledge encapsulated in the simplified ontology to enable user understanding of the knowledge at a high level.

16. A computer-implemented method of generating a simplified ontology comprising:
   using a computer processor for:
      loading an original ontology from a data store;
      simplifying the original ontology to produce a simplified ontology by:
         generating an abstraction of the original ontology; and
         applying at least one transformation to the abstraction for producing a simplified ontology; and
      generating the simplified ontology;
   wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

17. The computer-implemented method of claim 16, wherein applying the at least one transformation comprises:
   eliminating relationships in the abstraction, comprising inserting new relationships that simplify the original ontology.

18. The computer-implemented method of claim 16, wherein applying the at least one transformation comprises:
   eliminating individuals in the abstraction, comprising inserting new individuals that simplify said original ontology.

19. The computer-implemented method of claim 16, wherein applying the at least one transformation comprises:
   eliminating concepts in the abstraction, comprising inserting new concepts that simplify said original ontology.

20. The computer-implemented method of claim 16, further comprising reasoning over the simplified ontology instead of the original ontology.

21. The computer-implemented method of claim 16, further comprising generating an explanation of how a specific inference was made by an ontology reasoning engine.

22. The computer-implemented method of claim 16, further comprising compressing the original ontology with the simplified ontology.

23. The computer-implemented method of claim 16 wherein the simplified ontology tracks changes in the original ontology, such that updates to the original ontology do not require re-generation of the simplified ontology.

24. The computer-implemented method of claim 16, further comprising using the computer processor for:
   receiving the query; and
   executing the query in conjunction with the simplified ontology.

25. The computer-implemented method of claim 24 wherein executing the query further comprises identifying a sub-portion of the simplified ontology responsible for an inconsistency, and using it to find answers to the query in an original instance.

26. The computer-implemented method of claim 16 wherein the computer processor filters the simplified ontology to identify inconsistencies.

27. The computer-implemented method of claim 26 wherein the computer processor further iteratively refines at least one of individuals, roles, and concepts in the simplified ontology.

28. A computer-implemented method for processing a query against an original ontology, comprising:
    accessing the original ontology;
    generating a simplified ontology by:
        creating an abstraction of the original ontology; and
        applying at least one transformation to the abstraction; and
    applying the query against the simplified ontology to identify at least one instance of the query in the simplified ontology;
    wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

29. The computer-implemented method of claim 28 further comprising generating a refined simplified ontology and wherein applying the query comprises applying the query to the refined simplified ontology to identify an instance of the query in said refined simplified ontology.

30. The computer-implemented method of claim 29 further comprising identifying additional instances of the query in the original ontology based on the at least one transformation.

31. The computer-implemented method of claim 29 wherein applying at least one transformation comprises performing at least one of:
    simplifying relationships in the original ontology, comprising inserting at least one new relationship;
    collapsing individuals in the original ontology, comprising adding at least one new individual to encompass more than one individual from the original ontology; and
    eliminating concepts in the original ontology, comprising inserting at least one new concept.

32. A computer readable medium tangibly embodying a program instructions executable by a computer for processing a query against an original ontology, comprising:
    accessing the original ontology;
    generating a simplified ontology by creating an abstraction of the original ontology by applying at least one transformation to the original ontology; and
    applying the query against the simplified ontology to identify at least one instance of the query in the simplified ontology;
    wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

33. The computer-readable medium of claim 32 further comprising generating a refined simplified ontology and wherein applying the query comprises applying the query to the refined simplified ontology to identify an instance of the query in said refined simplified ontology.

34. The computer-readable medium of claim 33 further comprising identifying additional instances of the query in the original ontology based on the at least one transformation.

35. A computer readable medium tangibly embodying a program instructions executable by a computer for generating a simplified ontology, comprising:
    loading an original ontology from a data store;
    simplifying the original ontology to produce a simplified ontology by eliminating relationships in the ontology, comprising inserting new relationships that simplify the original ontology; and
    generating the simplified ontology;
    wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

36. The computer readable medium of claim 35 further comprising:
    eliminating individuals in the original ontology, comprising inserting new individuals to simplify said original ontology.

37. The computer readable medium of claim 36 further comprising: eliminating concepts in the original ontology, comprising inserting new concepts to simplify said original ontology.

38. The computer-readable medium of claim 37, further comprising reasoning over the simplified ontology instead of the original ontology.

39. The computer-readable medium of claim 35, further comprising compressing the original ontology with the simplified ontology.

40. An apparatus for computerized processing of a query for an original ontology, said apparatus comprising:
    a component for receiving the query;
    a component for accessing the original ontology; and
    a computerized ontology processing engine for:
        producing an abstraction of the original ontology; and
        applying at least one transformation to the abstraction to generate a simplified ontology; and
    executing the query against the simplified ontology;
    wherein the ontology is a formal explicit description of concepts in a domain of discourse (classes or concepts), properties of each concept describing various features and attributes of the concept (slots, roles, or properties), and restrictions on slots (facets or role restrictions), defining a common vocabulary for researchers who need to share information in a domain.

41. The apparatus of claim 40 wherein the ontology processing engine applies the at least one transformation by selecting one action from a group consisting of:
    eliminating relationships in the abstraction, comprising inserting new relationships that simplify the original ontology;
    eliminating individuals in the abstraction, comprising inserting new individuals that simplify said original ontology; and
    eliminating concepts in the abstraction, comprising inserting new concepts that simplify the original ontology.

* * * * *